US012534093B2

United States Patent
Nakamura et al.

(10) Patent No.: US 12,534,093 B2
(45) Date of Patent: Jan. 27, 2026

(54) MACHINE LEARNING SYSTEM FOR MODIFYING ADVANCED DRIVER ASSISTANCE SYSTEMS (ADAS) BEHAVIOR TO PROVIDE OPTIMUM VEHICLE TRAJECTORY IN A REGION

(71) Applicant: TOYOTA JIDOSHA KABUSHIKI KAISHA, Toyota (JP)

(72) Inventors: Akihito Nakamura, Toyota (JP); BaekGyu Kim, Mountain View, CA (US)

(*) Notice: Subject to any disclaimer, the term of this patent is extended or adjusted under 35 U.S.C. 154(b) by 564 days.

(21) Appl. No.: 16/536,224

(22) Filed: Aug. 8, 2019

(65) Prior Publication Data
US 2021/0039664 A1 Feb. 11, 2021

(51) Int. Cl.
*B60W 50/08* (2020.01)
*B60W 50/10* (2012.01)
(Continued)

(52) U.S. Cl.
CPC ........ *B60W 50/085* (2013.01); *B60W 50/082* (2013.01); *B60W 50/10* (2013.01); *G06N 20/00* (2019.01); *H04W 4/44* (2018.02)

(58) Field of Classification Search
CPC .. B60W 50/085; B60W 50/082; B60W 50/10; H04W 4/44; G06N 20/00
See application file for complete search history.

(56) References Cited

U.S. PATENT DOCUMENTS 8,494,759 B2 * 7/2013 Hada ................ G08G 1/096741
701/119
8,878,693 B2 * 11/2014 Nagura ............ G08G 1/096783
340/905

(Continued)

FOREIGN PATENT DOCUMENTS

EP     3651137 A1 *  5/2020  ............ G08G 1/167
JP  2007-241729 A    9/2007
(Continued)

OTHER PUBLICATIONS

JPO, Notice of Reasons for Refusal (with English translation) for Japanese Patent Application No. 2020-133731, Feb. 19, 2024, 15 pages.

(Continued)

*Primary Examiner* — Vivek D Koppikar
*Assistant Examiner* — Godfrey Aleksander Maciorowski
(74) *Attorney, Agent, or Firm* — Burbage Law, P.C.; Jon-Michael Burbage

(57) ABSTRACT

The disclosure includes embodiments for providing optimum vehicle behaviors in a region. In some embodiments, a method for a connected vehicle includes transmitting, via a Vehicle-to-Everything (V2X) communication, V2X data that includes customized data describing a customized need of the connected vehicle. The method includes receiving, via the V2X communication, vehicle behavior data describing an individual optimum behavior for the connected vehicle that is determined based at least in part on the V2X data. The method includes modifying an operation of a vehicle control system of the connected vehicle based on the vehicle behavior data so that the connected vehicle implements the individual optimum behavior. An implementation of the individual optimum behavior by the connected vehicle contributes to an achievement of an overall optimum behavior of a region where the connected vehicle is located while the customized need of the connected vehicle is also satisfied.

20 Claims, 15 Drawing Sheets

(51) Int. Cl.
*G06N 20/00* (2019.01)
*H04W 4/44* (2018.01)

(56) References Cited

U.S. PATENT DOCUMENTS

| | | | | |
|---|---|---|---|---|
| 8,903,593 | B1* | 12/2014 | Addepalli | H04L 45/12 |
| | | | | 701/30.6 |
| 9,727,820 | B2* | 8/2017 | Ono | G06N 7/00 |
| 10,062,288 | B2* | 8/2018 | Litkouhi | B60W 60/001 |
| 10,222,229 | B1* | 3/2019 | Shum | G07C 5/0841 |
| 10,486,707 | B2* | 11/2019 | Zelman | G08G 1/096725 |
| 10,584,971 | B1* | 3/2020 | Askeland | G01C 21/3859 |
| 10,654,476 | B2* | 5/2020 | Wray | B60W 30/18154 |
| 10,687,175 | B2* | 6/2020 | Kim | H04W 28/085 |
| 10,692,371 | B1* | 6/2020 | Nix | G07C 5/008 |
| 2012/0059574 | A1* | 3/2012 | Hada | G08G 1/0112 |
| | | | | 701/119 |
| 2017/0031361 | A1* | 2/2017 | Olson | B60W 30/0956 |
| 2017/0110014 | A1* | 4/2017 | Teng | B64U 10/14 |
| 2017/0120906 | A1* | 5/2017 | Penilla | G06Q 20/308 |
| 2017/0192429 | A1* | 7/2017 | Tseng | G08G 1/00 |
| 2017/0277194 | A1* | 9/2017 | Frazzoli | G05D 1/0212 |
| 2018/0004211 | A1* | 1/2018 | Grimm | G01C 21/3461 |
| 2019/0051061 | A1* | 2/2019 | Battles | G05D 1/0088 |
| 2019/0170521 | A1* | 6/2019 | Elhoushi | G01C 21/20 |
| 2019/0287392 | A1* | 9/2019 | Bielby | G08G 1/052 |
| 2019/0344797 | A1* | 11/2019 | Palanisamy | B60W 30/16 |
| 2019/0367040 | A1* | 12/2019 | Kameda | B60W 50/10 |
| 2019/0385360 | A1* | 12/2019 | Yang | G01C 21/3837 |
| 2020/0062255 | A1* | 2/2020 | Fernando | B60W 30/188 |
| 2020/0192307 | A1* | 6/2020 | Wee | B60W 40/09 |

FOREIGN PATENT DOCUMENTS

| | | |
|---|---|---|
| JP | 2018-26065 A | 2/2018 |
| JP | 2018-105235 A | 7/2018 |

OTHER PUBLICATIONS

JPO, Notice of Reasons for Refusal (with English translation) for Japanese Patent Application No. 2020-133731, Jul. 16, 2024, 9 pages.

* cited by examiner

MACHINE LEARNING SYSTEM FOR MODIFYING ADVANCED DRIVER ASSISTANCE SYSTEMS (ADAS) BEHAVIOR TO PROVIDE OPTIMUM VEHICLE TRAJECTORY IN A REGION

BACKGROUND

The specification relates to providing optimum vehicle behaviors in a region.

There may be various types of vehicles present on a roadway, e.g., autonomous vehicles, semi-autonomous vehicles, or human-driven vehicles, etc. Because the vehicles may have different destinations, driving plans and other driving preferences, it can be difficult to coordinate behaviors of these vehicles to reduce a risk of collision on the roadway.

SUMMARY

One general aspect of embodiments described herein includes a computer program product including a non-transitory memory of an onboard vehicle computer system of a connected vehicle storing computer-executable code that, when executed by a processor, causes the processor to: generate Vehicle-to-Everything (V2X) data that includes customized data describing a customized need of the connected vehicle; transmit, via a V2X communication, a feedback message including the V2X data; receive, via the V2X communication, a modification message that includes vehicle behavior data describing an individual optimum behavior for the connected vehicle, where the individual optimum behavior is determined based at least in part on the V2X data; and modify an operation of a vehicle control system of the connected vehicle based on the vehicle behavior data so that the connected vehicle implements the individual optimum behavior, where an implementation of the individual optimum behavior by the connected vehicle contributes to an achievement of an overall optimum behavior of a region where the connected vehicle is located while the customized need of the connected vehicle is also satisfied. Other embodiments of this aspect include corresponding computer systems, apparatus, and computer programs recorded on one or more computer storage devices, each configured to perform the actions of the methods.

Implementations may include one or more of the following features. The computer program product where the implementation of the individual optimum behavior by the connected vehicle indicates one or more of the following: no collision occurs between the connected vehicle and one or more other vehicles in the region; and the customized need of the connected vehicle is satisfied without interference on one or more customized needs of the one or more other vehicles. The computer program product where the connected vehicle and the one or more other vehicles are included in a group of vehicles in the region, and the achievement of the overall optimum behavior of the region indicates one or more of the following: no collision occurs in the group of vehicles; and a customized need of each vehicle in the group is satisfied without modifying that of remaining vehicles in the group. The computer program product where the customized need of the connected vehicle is described by one or more of: a driving intention of the connected vehicle and a first weight for the driving intention; and a driving preference of the connected vehicle and a second weight for the driving preference. Implementations of the described techniques may include hardware, a method or process, or computer software on a computer-accessible medium.

One general aspect includes a method for a connected vehicle, including: transmitting, via a V2X communication, V2X data that includes customized data describing a customized need of the connected vehicle; receiving, via the V2X communication, vehicle behavior data describing an individual optimum behavior for the connected vehicle that is determined based at least in part on the V2X data; and modifying an operation of a vehicle control system of the connected vehicle based on the vehicle behavior data so that the connected vehicle implements the individual optimum behavior, where an implementation of the individual optimum behavior by the connected vehicle contributes to an achievement of an overall optimum behavior of a region where the connected vehicle is located while the customized need of the connected vehicle is also satisfied. Other embodiments of this aspect include corresponding computer systems, apparatus, and computer programs recorded on one or more computer storage devices, each configured to perform the actions of the methods.

Implementations may include one or more of the following features. The method where the implementation of the individual optimum behavior by the connected vehicle indicates one or more of the following: no collision occurs between the connected vehicle and one or more other vehicles in the region; and the customized need of the connected vehicle is satisfied without interference on one or more customized needs of the one or more other vehicles. The method where the connected vehicle and the one or more other vehicles are included in a group of vehicles in the region, and the achievement of the overall optimum behavior of the region indicates one or more of the following: no collision occurs in the group of vehicles; and a customized need of each vehicle in the group is satisfied without modifying that of remaining vehicles in the group. The method where the customized need of the connected vehicle is described by one or more customized parameters and one or more weights for the one or more customized parameters. The method where the one or more customized parameters include one or more of a driving intention and a driving preference associated with the connected vehicle. The method further including: generating the V2X data that includes one or more of parameter data describing the one or more customized parameters, weight data describing the one or more weights, sensor data of the connected vehicle and Advanced Driver Assistance System (ADAS) data of the connected vehicle. The method further including predicting a future behavior of the connected vehicle, where the V2X data further includes prediction data describing the future behavior of the connected vehicle. The method where the individual optimum behavior includes one or more of an enforced trajectory, an acceleration setting, a steering-angle setting and a speed setting for the connected vehicle that are optimized for the connected vehicle. The method where the individual optimum behavior satisfies one or more of a traffic rule requirement and a safety requirement in the region. Implementations of the described techniques may include hardware, a method or process, or computer software on a computer-accessible medium.

One general aspect includes a system including an onboard vehicle computer system of a connected vehicle including a non-transitory memory storing computer code which, when executed by the onboard vehicle computer system, causes the onboard vehicle computer system to: transmit, via a V2X communication, V2X data that includes customized data describing a customized need of the connected vehicle; receive, via the V2X communication, vehicle behavior data describing an individual optimum behavior for the connected vehicle that is determined based at least in part on the V2X data; and modify an operation of a vehicle control system of the connected vehicle based on the vehicle behavior data so that the connected vehicle implements the individual optimum behavior, where an implementation of the individual optimum behavior by the connected vehicle contributes to an achievement of an overall optimum behavior of a region where the connected vehicle is located while the customized need of the connected vehicle is also satisfied. Other embodiments of this aspect include corresponding computer systems, apparatus, and computer programs recorded on one or more computer storage devices, each configured to perform the actions of the methods.

Implementations may include one or more of the following features. The system where the implementation of the individual optimum behavior by the connected vehicle indicates one or more of the following: no collision occurs between the connected vehicle and one or more other vehicles in the region; and the customized need of the connected vehicle is satisfied without interference on one or more customized needs of the one or more other vehicles. The system where the connected vehicle and the one or more other vehicles are included in a group of vehicles in the region, and the achievement of the overall optimum behavior of the region indicates one or more of the following: no collision occurs in the group of vehicles; and a customized need of each vehicle in the group is satisfied without modifying that of remaining vehicles in the group. The system where the customized need of the connected vehicle is described by one or more customized parameters and one or more weights for the one or more customized parameters. The system where the one or more customized parameters include one or more of a driving intention and a driving preference associated with the connected vehicle. The system where the computer code, when executed by the onboard vehicle computer system, causes the onboard vehicle computer system further to: generate the V2X data that includes one or more of parameter data describing the one or more customized parameters, weight data describing the one or more weights, sensor data of the connected vehicle and ADAS data of the connected vehicle. The system where the computer code, when executed by the onboard vehicle computer system, causes the onboard vehicle computer system further to predict a future behavior of the connected vehicle, where the V2X data further includes prediction data describing the future behavior of the connected vehicle. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1A:
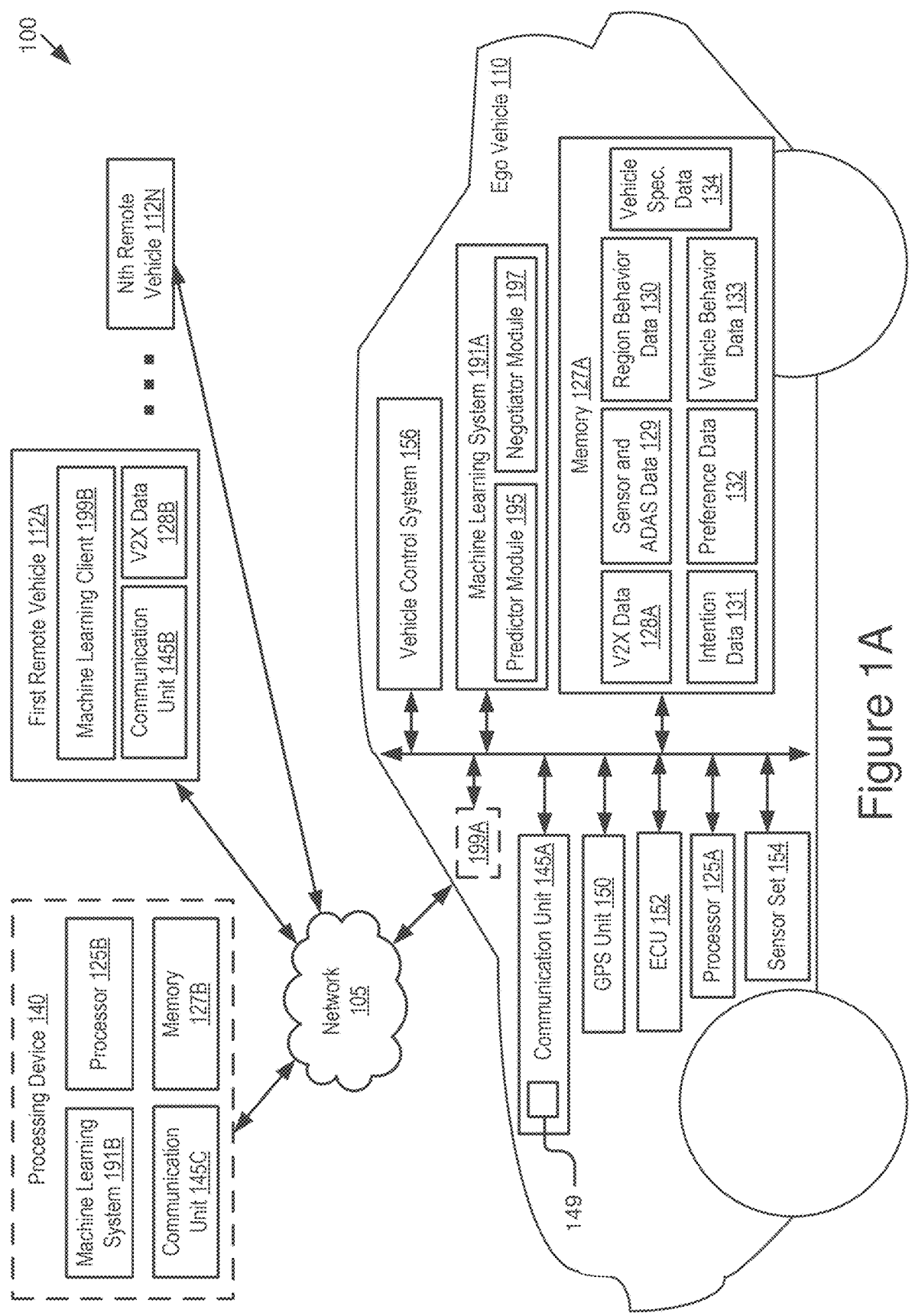
FIG. 1A is a block diagram illustrating an operating environment for a machine learning system and a machine learning client according to some embodiments.

It can be difficult to guarantee a satisfaction of fundamental driving requirements of a vehicle in some areas or some situations. Examples of fundamental driving requirements include, for example, a traffic rule requirement and a safety requirement, etc. For example, it may not be easy to guarantee an optimal operation of an ADAS system of a vehicle so that an optimal driving trajectory is provided to the vehicle and no collision occurs to the vehicle. In another example, for a human-driven vehicle, a driver of the vehicle may need to: (1) know a risk of collision; and (2) decide how to drive to avoid any potential collision.

Different drivers may have different driving intentions, driving preferences, and other driving habits. Some drivers may like to drive smoothly and fuel-efficiently, and others may like to drive fast to reduce travel time or increase driving enjoyment. Currently each driver determines their driving behavior by themselves. This is problematic because allowing drivers to select their driving behavior by themselves may sometimes increase a risk of collision with other vehicles or make other drivers give up their driving preferences or intentions.

Described herein are embodiments of a machine learning system and a machine learning client that cooperate with one another to achieve optimum vehicle behaviors in a region so that the problem described in the preceding paragraph is solved. The optimum vehicle behaviors include, for example, an optimum overall behavior of the region and optimum individual behaviors of vehicles present in the region. For example, the machine learning system and the machine learning client cooperate with one another to reconcile different driving preferences and intentions of different vehicles. The machine learning system and the machine learning client cooperate with one another to guarantee that no collision occurs among the vehicles and maximize, to the extent possible, each vehicle's ability to achieve its own preference and intention.

Example improvements and advantages provided by the machine learning system and the machine learning client described herein are described here. For example, the machine learning system and the machine learning client do not allow any particular vehicle to prioritize its own preference or intention over that of other vehicles and safe operations of the other vehicles within the particular region.

In another example, implementations of the machine learning system and the machine learning client do not require numerous communications between related endpoints. Thus, the machine learning system and the machine learning client can operate in real time for vehicles traveling at roadway speeds, and so, they are usable for vehicles in the real-world. In yet another example, the machine learning system and the machine learning client are also applicable with manually operated vehicles or non-autonomous vehicles.

In still yet another example, relative weights of driving preferences and intentions between different vehicles are considered when determining how to modify behaviors of the different vehicles. In comparison, existing solutions do not consider a weight of a driving preference or intention of any particular vehicle, much less a relative weight of these parameters of one vehicle relative to another. Other example improvements and advantages are also possible, which are not limited here.

An example overview of the machine learning system and the machine learning client is provided here. Assume that a roadway environment includes: (1) an ego vehicle; and (2) a set of remote vehicles. Alternatively, or additionally, the roadway environment includes a processing device (e.g., a cloud server, an edge server, a roadside unit, etc.). The ego vehicle is a connected vehicle that includes an instance of the machine learning system. Optionally, the machine learning system is installed in the processing device. The ego vehicle and the remote vehicles may or may not be autonomous vehicles. The remote vehicles may or may not be connected vehicles. The remote vehicles may or may not include an instance of the machine learning client.

The machine learning client includes software stored in an electronic control unit (ECU) of at least one of the remote vehicles. The machine learning client is operable to use the remote vehicle's onboard sensors and ADAS systems to generate V2X data and provide a feedback message including the V2X data to the machine learning system via V2X transmissions. The V2X data may include customized data describing a customized need of the remote vehicle. Here, a customized need of a vehicle (or a driver) may include one or more of a driving intention, a driving preference, and any other need of the vehicle (or the driver).

The machine learning system aggregates V2X data received from various vehicles in a region that each include an instance of the machine learning client. In this way the machine learning system receives digital data describing driving intentions and preferences of the various vehicles within the region. The machine learning system determines region behavior data based at least in part on the V2X data. The region behavior data includes digital data that describes an overall optimum behavior of the vehicles included in the region. For example, the region behavior data describes how these vehicles may interact with each other and other objects in their environment.

Collectively and individually, the overall optimum behavior describes behaviors of vehicles in the region that: guarantee that collisions with other vehicles are avoided; and allow drivers to meet their customized needs without modifying other drivers' customized needs.

The machine learning system analyzes the V2X data to determine each vehicle's driving intention and preference, as well of weights of the driving intention and preference relative to those of other vehicles. The machine learning system also determines an individual optimum behavior of each vehicle within the region. The individual optimum behavior of each vehicle contributes to an achievement of the overall optimum behavior of the region and meanwhile the customized need of each vehicle is also satisfied. The machine learning system takes operations needed to negotiate the individual optimum behavior of each vehicle with a vehicle control system (e.g., an ADAS system) of that vehicle so that the overall optimum behavior of the region is achieved.

The machine learning system sends vehicle behavior data describing the individual optimum behavior of each vehicle to the corresponding vehicle. Then, the vehicle control system of the corresponding vehicle controls the corresponding vehicle to operate in conformity with the individual optimum behavior described by the vehicle behavior data. In this way, the overall optimum behavior of the vehicles in the region is achieved and customized needs of the vehicles are also satisfied.

As described herein, examples of V2X communications include Dedicated Short-Range Communication (DSRC) (including Basic Safety Messages (BSMs) and Personal Safety Messages (PSMs), among other types of DSRC communication). Further examples of V2X communications include: Long-Term Evolution (LTE); millimeter wave (mmWave) communication; 3G; 4G; 5G; LTE-V2X; 5G-V2X; LTE-Vehicle-to-Vehicle (LTE-V2V); LTE-Device-to-Device (LTE-D2D); or Voice over LTE (VoLTE); etc. In some examples, the V2X communications can include V2V communications, Vehicle-to-Infrastructure (V2I) communications, Vehicle-to-Network (V2N) communications or any combination thereof.

Examples of a wireless message (e.g., a V2X message) described herein include, but are not limited to, the following messages: a DSRC message; a BSM message; and a LTE message. Further examples of a wireless message include one or more of the following: a LTE-V2X message (e.g., a LTE-V2V message, a LTE-V2I message, a LTE-V2N message, etc.); a 5G-V2X message; and a millimeter wave message, etc.

Example Overview

Referring to FIG. 1A, depicted is an operating environment 100 for a machine learning client 199B and a machine learning system 191A, B according to some embodiments. The operating environment 100 may include one or more of the following elements: an ego vehicle 110; and one or more remote vehicles 112 (e.g., a first remote vehicle 112A, . . . , an Nth remote vehicle 112N). Optionally, the operating environment 100 may also include a processing device 140. These elements of the operating environment 100 may be communicatively coupled to a network 105. In practice, the operating environment 100 may include any number of ego vehicles 110, remote vehicles 112, processing devices 140 and networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS) and multimedia messaging service (MMS). In some embodiments, the network 105 further includes networks for hypertext transfer protocol (HTTP), direct data connection, wireless application protocol (WAP), e-mail, DSRC, full-duplex wireless communication and mmWave. In some embodiments, the network 105 further includes networks for WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE, 5G-V2X or any other mobile data network or combination of mobile data networks. Further, the network 105 may include one or more IEEE 802.11 wireless networks.

The ego vehicle 110 may be any type of vehicle. For example, the ego vehicle 110 may include one of the following types of vehicles: a car; a truck; a sports utility vehicle; a bus; a semi-truck; a drone; or any other roadway-based conveyance. The ego vehicle 110 may be a connected vehicle that includes a communication unit and is capable of communicating with other endpoints connected to the network 105.

In some embodiments, the ego vehicle 110 is a DSRC-enabled vehicle which includes a DSRC radio and a DSRC-compliant Global Positioning System (GPS) unit. The ego vehicle 110 may also include other V2X radios besides a DSRC radio. DSRC is not a requirement of embodiments described herein, and any form of V2X communications is also feasible.

The ego vehicle 110 may include one or more of the following elements: a processor 125A; a memory 127A; a communication unit 145A; a GPS unit 150; an ECU 152; a sensor set 154; a vehicle control system 156; and a machine learning system 191A. In some embodiments, the ego vehicle 110 also includes an instance of the machine learning client 199 (e.g., a machine learning client 199A). These elements of the ego vehicle 110 may be communicatively coupled to one another via a bus.

In some embodiments, the processor 125A and the memory 127A may be elements of an onboard vehicle computer system (such as computer system 200 described below with reference to FIG. 2). The onboard vehicle computer system may be operable to cause or control the operation of the machine learning system 191A (or the machine learning client 199A). For example, the onboard vehicle computer system may be operable to access and execute the data stored on the memory 127A to provide the functionality described herein for the machine learning client 199A or its elements (see, e.g., FIG. 2).

The processor 125A includes an arithmetic logic unit, a microprocessor, a general-purpose controller, or some other processor array to perform computations and provide electronic display signals to a display device. The processor 125A processes data signals and may include various computing architectures. Example computing architectures include a complex instruction set computer (CISC) architecture, a reduced instruction set computer (RISC) architecture, or an architecture implementing a combination of instruction sets. The ego vehicle 110 may include one or more processors 125A. Other processors, operating systems, sensors, displays, and physical configurations may be possible.

The memory 127A stores instructions or data that may be executed by the processor 125A. The instructions or data may include code for performing the techniques described herein. The memory 127A may be a dynamic random-access memory (DRAM) device, a static random-access memory (SRAM) device, flash memory, or some other memory device. In some embodiments, the memory 127A also includes a non-volatile memory or similar permanent storage device and media. Example permanent storage devices include a hard disk drive, a floppy disk drive, a CD-ROM device, a DVD-ROM device, a DVD-RAM device, a DVD-RW device, and a flash memory device, etc. Additional example permanent storage devices may include some other mass storage device for storing information on a more permanent basis. The ego vehicle 110 may include one or more memories 127A.

The memory 127A may store one or more of the following elements: V2X data 128A; sensor and ADAS data 129; region behavior data 130; intention data 131; preference data 132; vehicle behavior data 133; and vehicle specification data 134.

In some embodiments, the V2X data 128A may include digital data related to the ego vehicle 110 itself. For example, the V2X data 128A may include customized data describing a customized need of the ego vehicle 110. The customized need may be described by one or more customized parameters and one or more weights for the one or more customized parameters. The one or more customized parameters may include, for example, a driving intention described by the intention data 131 and a driving preference described by the preference data 132. For example, the V2X data 128A includes customized data that describes: (1) a driving intention or preference of a driver of the ego vehicle 110; and (2) a weight of the driving intention or preference describing how strong the driving intention or preference is.

In some embodiments, the V2X data 128A further includes sensor and ADAS data 129 generated by the ego vehicle 110. In some embodiments, the V2X data 128A describes some or all of the design specification of the ego vehicle 110. The machine learning client 199A of the ego vehicle 110 may transmit, via a feedback message, the V2X data 128A related to the ego vehicle 110 to other endpoints (e.g., the processing device 140 or the remote vehicle 112). The feedback message may be a wireless message.

In some embodiments, the V2X data 128A may include an aggregated set of V2X data received from a set of remote vehicles 112 in a region where the ego vehicle 110 is present. For example, each instance of the V2X data received from a particular remote vehicle 112 may include customized data describing a customized need (e.g., a driving intention, a driving preference, or a combination thereof) of the remote vehicle. The instance of the V2X data received from the particular remote vehicle 112 may also include sensor and ADAS data generated by the remote vehicle 112 and data describing some or all of the design specification of the remote vehicle 112. By aggregating the V2X data received from the remote vehicles 112, customized needs, design specifications and sensor and ADAS data of the remote vehicles 112 are aggregated for the operation of the machine learning system 191A.

The sensor and ADAS data 129 may include sensor data and ADAS data. The sensor data includes digital data that describes one or more sensor measurements recorded by sensors of the sensor set 154. The sensor data may be inputted to one or more ADAS systems of the ego vehicle 110 so that they may provide their functionality. For example, the one or more ADAS systems perceive the environment of the ego vehicle 110 and determine vehicular responses to the environment. The ADAS data includes digital data that describes the analysis of the ADAS systems and the vehicular responses.

In some embodiments, the sensor and ADAS data 129 includes digital data that describes a behavior of a driver of the ego vehicle 110, as well as a context for the behavior. For example, the context for the behavior may include events occurring before, during or perhaps after the behavior. These events include behaviors of other drivers, a time of day, a day of week, weather, whether a driving condition is urban or rural, etc. The sensor and ADAS data 129 may also include uniquely identifying information of the ego vehicle 110 (e.g., a Vehicle Identification Number (VIN)).

The sensor and ADAS data 129 may also include behaviors of drivers of the remote vehicles 112, as well as contexts for these behaviors, recorded by the sensor set 154 of the ego vehicle 110. The sensor and ADAS data 129 may also include uniquely identifying information of the remote vehicles 112. For example, the sensor and ADAS data 129 may include license plate information of the remote vehicles 112 such as a license plate number and state, province, commonwealth, or another jurisdiction that issues the license plate.

In some embodiments, the machine learning client 199A may cause the sensor set 154 and the ADAS system of the ego vehicle 110 to record the sensor and ADAS data 129. In some embodiments, the sensor and ADAS data 129 may include digital data describe a behavior of a surrounding vehicle that does not include a machine learning client. The sensor and ADAS data 129 may be included in the V2X data and transmitted to the machine learning system 191 via a feedback message. In this way, the machine learning system 191 receives digital data that is usable to predict future behaviors of vehicles and thereby account for the behaviors of these vehicles to avoid collisions when generating vehicle behavior data for these vehicles.

The region behavior data 130 may include digital data that describes an overall optimum behavior of vehicles present in a region where the ego vehicle 110 is located. For example, the region behavior data 130 describes how these vehicles may interact with each other and other objects in their environment.

The intention data 131 may include digital data that describes a driving intention of the ego vehicle 110. In some embodiments, a driving intention includes a driver's planned trajectory (e.g., a current position, a future position, a velocity, an acceleration, a steering angle, etc.).

The preference data 132 may include digital data that describes a driving preference of the ego vehicle 110. A driving preference includes, for example, a driver's preference for prioritizing economy of fuel consumption, getting to a destination as quickly as possible, or comfort experience, etc.

The vehicle behavior data 133 may include digital data that describes an individual optimum behavior for the ego vehicle 110. The individual optimum behavior is described below in more detail.

The vehicle specification data 134 may include digital data that describes one or more design specifications of the ego vehicle 110. For example, the one or more design specifications include one or more of a length, width, tire distance, maximum acceleration, maximum steering angle, total weight, and controllability of the ego vehicle 110, etc. The controllability of the ego vehicle 110 may indicate whether the ego vehicle 110 is controllable by the vehicle control system 156. If the ego vehicle 110 is a controllable vehicle, an individual optimum behavior generated by the machine learning system 191 can be implemented by the ego vehicle 110 automatically. If the ego vehicle 110 is an uncontrollable vehicle, a human driver may follow instructions provided via a user interaction interface 161 to implement the individual optimum behavior (see, e.g., FIG. 1B).

The communication unit 145A transmits and receives data to and from the network 105 or to another communication channel. In some embodiments, the communication unit 145A may include a DSRC transceiver, a DSRC receiver and other hardware or software necessary to make the ego vehicle 110 a DSRC-enabled device. For example, the communication unit 145A includes a DSRC antenna configured to broadcast DSRC messages via the network. The DSRC antenna may also transmit BSM messages at a fixed or variable interval (e.g., every 0.1 seconds, at a time interval corresponding to a frequency range from 1.6 Hz to 10 Hz, etc.) that is user configurable.

In some embodiments, the communication unit 145A includes a port for direct physical connection to the network 105 or to another communication channel. For example, the communication unit 145A includes a USB, SD, CAT-5, or similar port for wired communication with the network 105. In some embodiments, the communication unit 145A includes a wireless transceiver for exchanging data with the network 105 or other communication channels using one or more wireless communication methods. Example wireless communication methods may include one or more of the following: IEEE 802.11; and IEEE 802.16, BLUETOOTH®. Example wireless communication methods may further include EN ISO 14906:2004 Electronic Fee Collection—Application interface EN 11253:2004 DSRC—Physical layer using microwave at 5.8 GHz (review). Example wireless communication methods may further include EN 12795:2002 DSRC—DSRC Data link layer: Medium Access and Logical Link Control (review). Example wireless communication methods may further include EN 12834:2002 DSRC—Application layer (review) and EN 13372:2004 DSRC—DSRC profiles for RTTT applications (review). Example wireless communication methods may further include the communication method described in U.S. patent application Ser. No. 14/471,387 filed on Aug. 28, 2014 and entitled "Full-Duplex Coordination System"; or another suitable wireless communication method.

In some embodiments, the communication unit 145A includes a cellular communications transceiver for sending and receiving data over a cellular communications network. For example, the data may be sent or received via short messaging service (SMS), multimedia messaging service (MMS), hypertext transfer protocol (HTTP), direct data connection, WAP, e-mail, or another suitable type of electronic communication. In some embodiments, the communication unit 145A includes a wired port and a wireless transceiver. The communication unit 145A also provides other conventional connections to the network 105 for distribution of files or media objects using standard network protocols including TCP/IP, HTTP, HTTPS, and SMTP, millimeter wave, DSRC, etc.

The communication unit 145A may include a V2X radio 149. The V2X radio 149 may include a hardware element including a DSRC transmitter which is operable to transmit DSRC messages on the 5.9 GHz band. The 5.9 GHz band is reserved for DSRC messages. The hardware element may also include a DSRC receiver which is operable to receive DSRC messages on the 5.9 GHz band.

In some embodiments, the GPS unit 150 is a conventional GPS unit of the ego vehicle 110. For example, the GPS unit 150 may include hardware that wirelessly communicates with a GPS satellite to retrieve data that describes a geographic location of the ego vehicle 110. In some embodiments, the GPS unit 150 is a DSRC-compliant GPS unit of the ego vehicle 110. The DSRC-compliant GPS unit is operable to provide GPS data describing the geographic location of the ego vehicle 110 with lane-level accuracy.

The ECU 152 can include one or more processors and one or more memories. The ECU 152 may control an operation of the vehicle control system 156, the sensor set 154 and the machine learning client 199A (or the machine learning system 191A) of the ego vehicle 110. In some embodiments, the machine learning client 199A (or the machine learning system 191A) of the ego vehicle 110 is installed in the ECU 152.

The sensor set 154 includes one or more sensors that are operable to measure a roadway environment outside of the ego vehicle 110. For example, the sensor set 154 may include one or more sensors that record one or more physical characteristics of the roadway environment that is proximate to the ego vehicle 110. The memory 127 may store sensor data that describes the one or more physical characteristics recorded by the sensor set 154.

The sensor set 154 may also include various sensors that record an environment internal to a cabin of the ego vehicle 110. For example, the sensor set 154 includes onboard sensors which monitor the environment of the ego vehicle 110 whether internally or externally. In a further example, the sensor set 154 includes cameras, LIDAR, radars, infrared sensors, and sensors that observe the behavior of the driver such as internal cameras, biometric sensors, etc.

In some embodiments, the sensor set 154 may include one or more of the following vehicle sensors: a camera; a LIDAR sensor; a radar sensor; a laser altimeter; an infrared detector; a motion detector; a thermostat; and a sound detector. The sensor set 154 may also include one or more of the following sensors: a carbon monoxide sensor; a carbon dioxide sensor; an oxygen sensor; a mass air flow sensor; and an engine coolant temperature sensor. The sensor set 154 may also include one or more of the following sensors: a throttle position sensor; a crank shaft position sensor; an automobile engine sensor; a valve timer; an air-fuel ratio meter; and a blind spot meter. The sensor set 154 may also include one or more of the following sensors: a curb feeler; a defect detector; a Hall effect sensor, a manifold absolute pressure sensor; a parking sensor; a radar gun; a speedometer; and a speed sensor. The sensor set 154 may also include one or more of the following sensors: a tire-pressure monitoring sensor; a torque sensor; a transmission fluid temperature sensor; and a turbine speed sensor (TSS); a variable reluctance sensor; and a vehicle speed sensor (VSS). The sensor set 154 may also include one or more of the following sensors: a water sensor; a wheel speed sensor; and any other type of automotive sensor.

The vehicle control system 156 may control an operation of the ego vehicle 110. For example, the vehicle control system 156 may provide some or all of the autonomous functionality for the ego vehicle 110. In some embodiments, the vehicle control system 156 may include one or more ADAS systems, an autonomous driving system or a combination thereof.

Examples of the ADAS systems included in the ego vehicle 110 include one or more of the following: an automatic cruise control (ACC) system; an adaptive high beam system; an adaptive light control system; and an automatic parking system. Further examples of the ADAS systems include: an automotive night vision system; a blind spot monitor; a collision avoidance system; a crosswind stabilization system; a driver drowsiness detection system; and a driver monitoring system. Further examples of the ADAS systems include: an emergency driver assistance system; a forward collision warning system; an intersection assistance system; an intelligent speed adaption system; a lane departure warning system (sometimes referred to as a lane keep assistant). Further examples of the ADAS systems include: a pedestrian protection system; a traffic sign recognition system; a turning assistant; and a wrong way driving warning system, etc. The features and functionality provided by these example ADAS systems are also referred to herein as an "autonomous feature" or an "autonomous functionality," respectively. In practice, the onboard systems include any vehicle feature having functionality which allows it to monitor and track the operational data and the route data, and not just ADAS systems.

The remote vehicle 112 present on a roadway of the ego vehicle 110 may have a structure similar to that of the ego vehicle 110. Similar description will not be repeated here. The operating environment 100 may include multiple remote vehicles 112 (e.g., the first remote vehicle 112A, . . . , the Nth remote vehicle 112N). In some embodiments, the first remote vehicle 112A may include an instance of the machine learning client (e.g., a machine learning client 199B) and a communication unit 145B. The remote vehicle 112A may also store V2X data 128B in its local storage device. The remote vehicle 112N may have a structure similar to that of the remote vehicle 112A, and so, similar description will not be repeated here.

The V2X data 128A and the V2X data 128B may have similar content and may be referred to herein as "V2X data 128" individually or collectively. Similar description for the V2X data 128B will not be repeated here.

The machine learning clients 199A and 199B may have a similar structure and provide similar functionality and may be referred to herein as "machine learning client 199" individually or collectively.

In some embodiments, the machine learning client 199 includes software that is operable, when executed by the processor 125, to cause the processor 125 to execute one or more steps of a method 300 described below with reference to FIG. 3. In some embodiments, the machine learning client 199 may be implemented using hardware including a field-programmable gate array ("FPGA") or an application-specific integrated circuit ("ASIC"). In some other embodiments, the machine learning client 199 may be implemented using a combination of hardware and software. The machine learning client 199 may be stored in a combination of the devices (e.g., servers or other devices), or in one of the devices.

The machine learning client 199 is described below in more detail with reference to FIGS. 1B, 2-3 and 5A-7D.

The processing device 140 may be one of a cloud server, an edge server, a roadside unit, or any other processing device. The processing device 140 includes an instance of the machine learning system (e.g., a machine learning system 191B), a processor 125B, a memory 127B, a communication unit 145C and any other appropriate components.

The processors 125A and 125B may have a similar structure and provide similar functionality and may be referred to herein as "processor 125" individually or collectively. The memories 127A and 127B may have a similar structure and provide similar functionality and may be referred to herein as "memory 127" individually or collectively. The communication units 145A, 145B and 145C may have a similar structure and provide similar functionality and may be referred to herein as "communication unit 145" individually or collectively. Similar description for the processor 125B, the memory 127B, and the communication units 145B and 145C will not be repeated here.

The machine learning systems 191A and 191B may have a similar structure and provide similar functionality and may be referred to herein as "machine learning system 191" individually or collectively.

In some embodiments, the machine learning system 191 includes software that is operable, when executed by the processor 125, to cause the processor 125 to execute one or more steps of a method 400 described below with reference to FIG. 4. In some embodiments, the machine learning system 191 may be implemented using hardware including an FPGA or an ASIC. In some other embodiments, the machine learning system 191 may be implemented using a combination of hardware and software. The machine learning system 191 may be stored in a combination of the devices (e.g., servers or other devices), or in one of the devices.

In some embodiments, the machine learning system 191 may include one or more of a predictor module 195 and a negotiator module 197. The machine learning system 191 as well as the predictor module 195 and the negotiator module 197 is described below in more detail with reference to FIGS. 1B-1D and 4-7D.

Figure 1B:
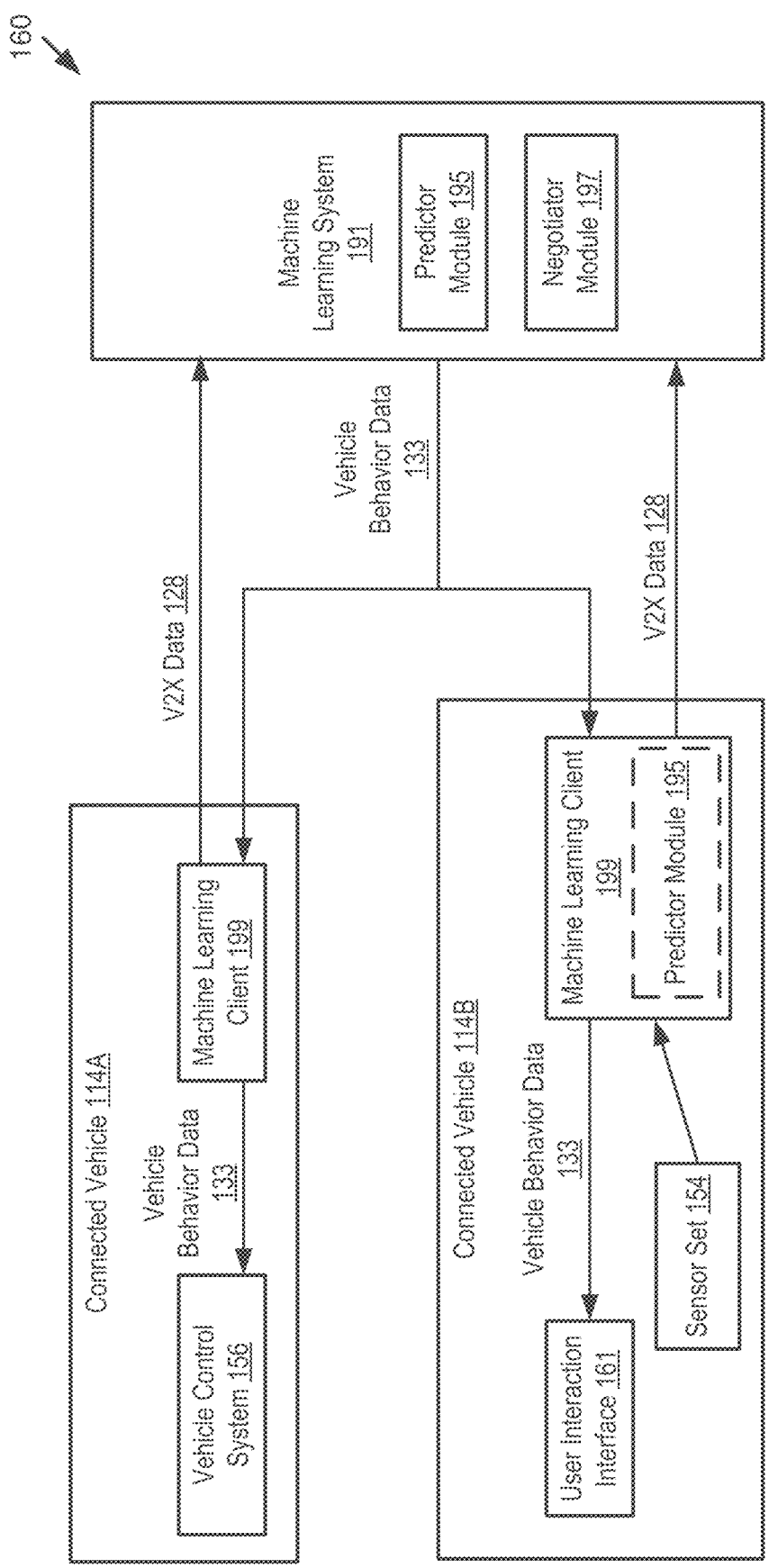
FIG. 1B is a block diagram illustrating an architecture including the machine learning system and various instances of the machine learning client installed in various vehicles according to some embodiments.

Referring now to FIG. 1B, illustrated is an architecture 160 including the machine learning system 191 and various instances of the machine learning client 199 installed in various connected vehicles 114 according to some embodiments. By way of example, two connected vehicles 114A and 114B are illustrated in FIG. 1B. The connected vehicle 114A includes the vehicle control system 156 and can be an autonomous vehicle or a semi-autonomous vehicle. For example, the connected vehicle 114A can be controlled by one or more ADAS systems and driven by a system driver. The connected vehicle 114B may or may not include the vehicle control system 156. The connected vehicle 114B can be driven by a human driver.

Each connected vehicle 114 includes an instance of the machine learning client 199. Each connected vehicle 114 can be the ego vehicle 110 or the remote vehicle 112 as shown in FIG. 1A. For each connected vehicle 114, the machine learning client 199 causes its sensor set 154 and ADAS systems to collect sensor and ADAS data.

In some examples, the predictor module 195 is installed in the machine learning client 199 of the connected vehicle 114. In this case, the machine learning client 199 stores a data structure that describes past behaviors of the connected vehicle 114. The predictor module 195 analyzes current sensor data and current ADAS data of the connected vehicle 114 to estimate a future behavior of the connected vehicle 114 by comparison to the past behaviors of the connected vehicle 114. The machine learning client 199 may include a learning algorithm that continuously improves the ability of the predictor module 195 to predict the behavior of the connected vehicle 114.

In some examples, the predictor module 195 is installed in the machine learning system 191. Operations of predicting the future behavior of the connected vehicle 114 is executed by the machine learning system 191 after receipt of the V2X data from the connected vehicle 114 and analysis of this V2X data (as described below in more detail).

In other words, a prediction of the future behavior of the connected vehicle 114 is executed by either the machine learning client 199 or the machine learning system 191, but not both. However, in some embodiments, the future behavior of the connected vehicle 114 can be provided by a system driver (e.g., an ADAS system or an autonomous driving system, etc.) or a human driver of the connected vehicle 114. The future behavior of the connected vehicle 114 may include a planned trajectory (e.g., a current position, a future position, a velocity, an acceleration setting and a steering angle setting, etc.) of the connected vehicle 114, etc. The future behavior of the connected vehicle 114 can be included as part of the driving intention of the connected vehicle 114.

The machine learning client 199 generates V2X data 128 based on the sensor and ADAS data, and optionally, other data such as user inputs. The V2X data 128 describes the sensor and ADAS data, and, optionally, the future behavior of the connected vehicle 114. For example, the V2X data 128 includes customized data describing a customized need of the connected vehicle 114 (e.g., a driving preference and a weight for the driving preference, a driving intention, and a weight for the driving intention). In another example, the V2X data 128 further includes data describing a roadway environment surrounding the connected vehicle 114 and data describing a vehicle state of the connected vehicle 114. In yet another example, the V2X data 128 further includes data describing a design specification of the connected vehicle 114.

The machine learning client 199 causes the communication unit 145 to transmit a feedback message via a V2X network, and the feedback message includes the V2X data 128 as its payload. Then, the machine learning system 191 receives the feedback message from the connected vehicle 114. In this way, the machine learning system 191 receives a plurality of feedback messages, one for each of the connected vehicles 114. The machine learning system 191 parses respective V2X data from each of the feedback messages.

In some embodiments, the machine learning system 191 stores a data structure that describes the past behaviors of the connected vehicles 114. For example, this data structure describes the behaviors of connected vehicles in general, and not the behaviors of specific connected vehicles. The predictor module 195 of the machine learning system 191 analyzes the current sensor and ADAS data of a particular connected vehicle 114 to estimate the future behavior of the connected vehicle 114 by comparison to past behaviors of other connected vehicles 114. The predictor module 195 includes a learning algorithm that continuously improves the ability of the predictor module 195 to predict the behaviors of the connected vehicles based on the V2X data that is received from these connected vehicles 114.

The negotiator module 197 of the machine learning system 191 determines a customized need of each connected vehicle 114 based on the V2X data 128 received from that connected vehicle 114. For example, the negotiator module 197 determines, for each connected vehicle 114, one or more of the following: a driving preference; a weight of the driving preference; a driving intention; and a weight of the driving intention, etc.

The negotiator module 197 determines, for a group of connected vehicles 114 located in the region, relative weights of the driving preferences and driving intentions.

The negotiator module 197 determines region behavior data describing an optimum overall behavior of the connected vehicles 114 located in the region. For example, the negotiator module 197 determines region behavior data based on one or more determination factors. Examples of the determination factors include: the V2X data (including driving intentions and driving preferences) of the connected vehicles 114; and traffic or safety standards in the region. Further examples of the determination factors include: historic crash data describing real-world incidents in the region; and the preferences of a vehicle manufacturer, roadway authority, or design engineer. Further examples of the determination factors include: a traffic rule requirement (e.g., a speed limit, a traffic signal, a direction of travel, etc.) in the region; and a safety requirement (e.g., a minimum distance and a relative speed between two adjacent vehicles) in the region. Further examples of the determination factors include digital simulations that are generated based at least in part on the other determination factors described above.

The negotiator module 197 generates, for each connected vehicle 114 that provides V2X data, vehicle behavior data 133 that describes an individual optimum behavior of this vehicle. This individual optimum behavior is optimized by the machine learning system 191 to maximize the ability of this vehicle to meet its customized need (e.g., its driving preference or intention) so long as doing so is consistent with the optimum overall behavior of the region. For example, the individual optimum behavior for each connected vehicle 114 contributes to an achievement of the optimum overall behavior of the region. Also, the individual optimum behavior for each connected vehicle does not interfere with other vehicle's ability to meet their customized needs.

In some embodiments, the individual optimum behavior for each connected vehicle 114 is a safe behavior that satisfies one or more of a traffic rule requirement and a safety requirement in the region while maximizing a fulfillment of the customized need of the vehicle. In some embodiments, the individual optimum behavior includes one or more of an enforced trajectory, an acceleration setting, a steering-angle setting and a speed setting for the connected vehicle 114 that are optimized for the connected vehicle 114.

The negotiator module 197 generates modification messages that are transmitted to the connected vehicles 114. The modification messages may be wireless messages and include the vehicle behavior data 133 for these connected vehicles 114, respectively. Different instances of vehicle behavior data 133 are likely different from each other because different vehicles may have different customized needs (e.g., different driving preferences and intentions). The negotiator module 197 transmits the modification messages to the connected vehicles 114, respectively.

Then, the machine learning client 199 of each connected vehicle 114 receives its particular modification message and parses out the corresponding vehicle behavior data 133 included in the modification message it receives.

For a connected vehicle 114 that has a system driver and is controllable by the vehicle control system 156 (e.g., the vehicle 114A), the machine learning client 199 modifies one or more operations of the vehicle control system 156 based on its vehicle behavior data 133. For example, the machine learning client 199 modifies settings of the ADAS systems of the vehicle based on its vehicle behavior data 133. Then, the connected vehicle 114A is controlled to operate in conformity with the individual optimum behavior described by its vehicle behavior data 133.

For a connected vehicle 114 that has a human driver and is not controlled by the vehicle control system 156 (e.g., the vehicle 114B), the machine learning client 199 provides a notification to the driver via the user interaction interface 161. The notification may include instructions to operate the vehicle to comply with the individual optimum behavior described by the vehicle behavior data 133. The user interaction interface 161 may include a display (e.g., a touch screen), an audio playing device (e.g., a speaker), a camera and any other interface that can be used to interact with the driver.

Figure 1C:
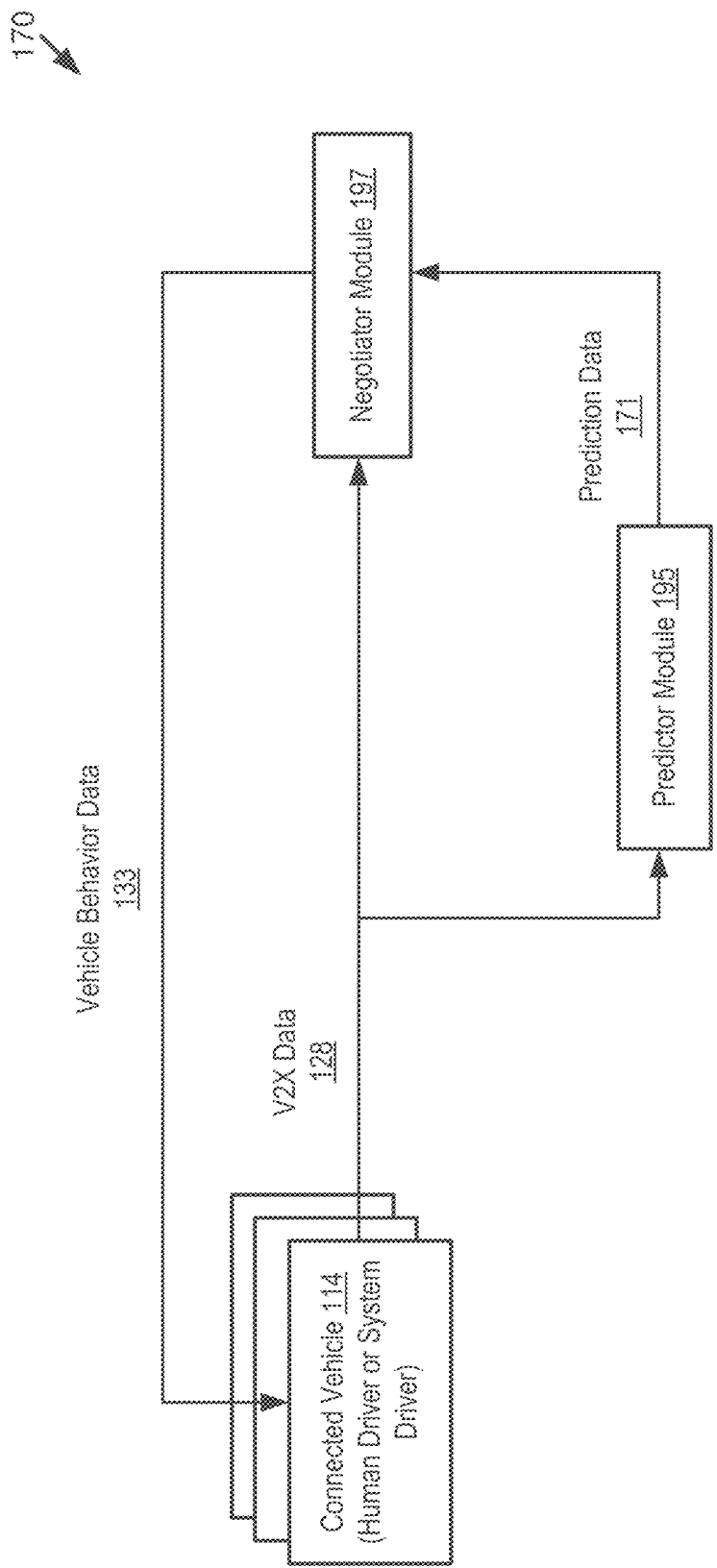
FIG. 1C is a block diagram illustrating an architecture including components of the machine learning system and one or more connected vehicles according to some embodiments.

FIG. 1C is a block diagram illustrating an architecture 170 including components of the machine learning system 191 and one or more connected vehicles 114 according to some embodiments. Here, in this example, the machine learning system 191 includes the predictor module 195 and the negotiator module 197.

The predictor module 195 includes code and routines that are operable, when executed by a processor, to cause the processor to analyze V2X data 128 received from the connected vehicles 114 and predict future behaviors of the connected vehicles 114. The predictor module 195 may include a machine learning algorithm so that its predictions can improve automatically over time.

In some embodiments, if the V2X data 128 received from a particular connected vehicle 114 does not include data describing its customized need, the predictor module 195 may estimate the customized need of the vehicle. Besides, if the V2X data 128 received from the particular connected vehicle 114 does not include data describing its future behavior, the predictor module 195 may generate prediction data 171 describing a future behavior of the vehicle. For example, the predictor module 195 may estimate one or more of: a driving preference and a weight for the driving preference; a driving intention and a weight for the driving intention; and a future behavior of the vehicle based on the V2X data 128 of the vehicle.

The negotiator module 197 includes code and routines that are operable, when executed by the processor, to cause the processor to analyze the V2X data 128 received from the connected vehicles 114 and determine vehicle behavior data for the connected vehicles 114. In some embodiments, the negotiator module 197 provides its functionality based on the predicted future behaviors that are outputted by the predictor module 195.

In some embodiments, the negotiator module 197 does not include a machine learning algorithm because behaviors produced from machine learning algorithms are experimental and not suitable for safety applications. Accordingly, generation of the overall optimum behavior of the region and individual optimum behaviors of the connected vehicles 114 are not the byproduct of executing a machine learning algorithm. Instead, the negotiator module 197 may use optimization mechanisms to produce safety-guaranteed behaviors. Examples of an application of optimization mechanisms are shown with reference to FIGS. 7A-7D.

The predictor module 195 and the negotiator module 197 are described above with reference to FIG. 1B, and so, similar description will not be repeated here.

Figure 1D:
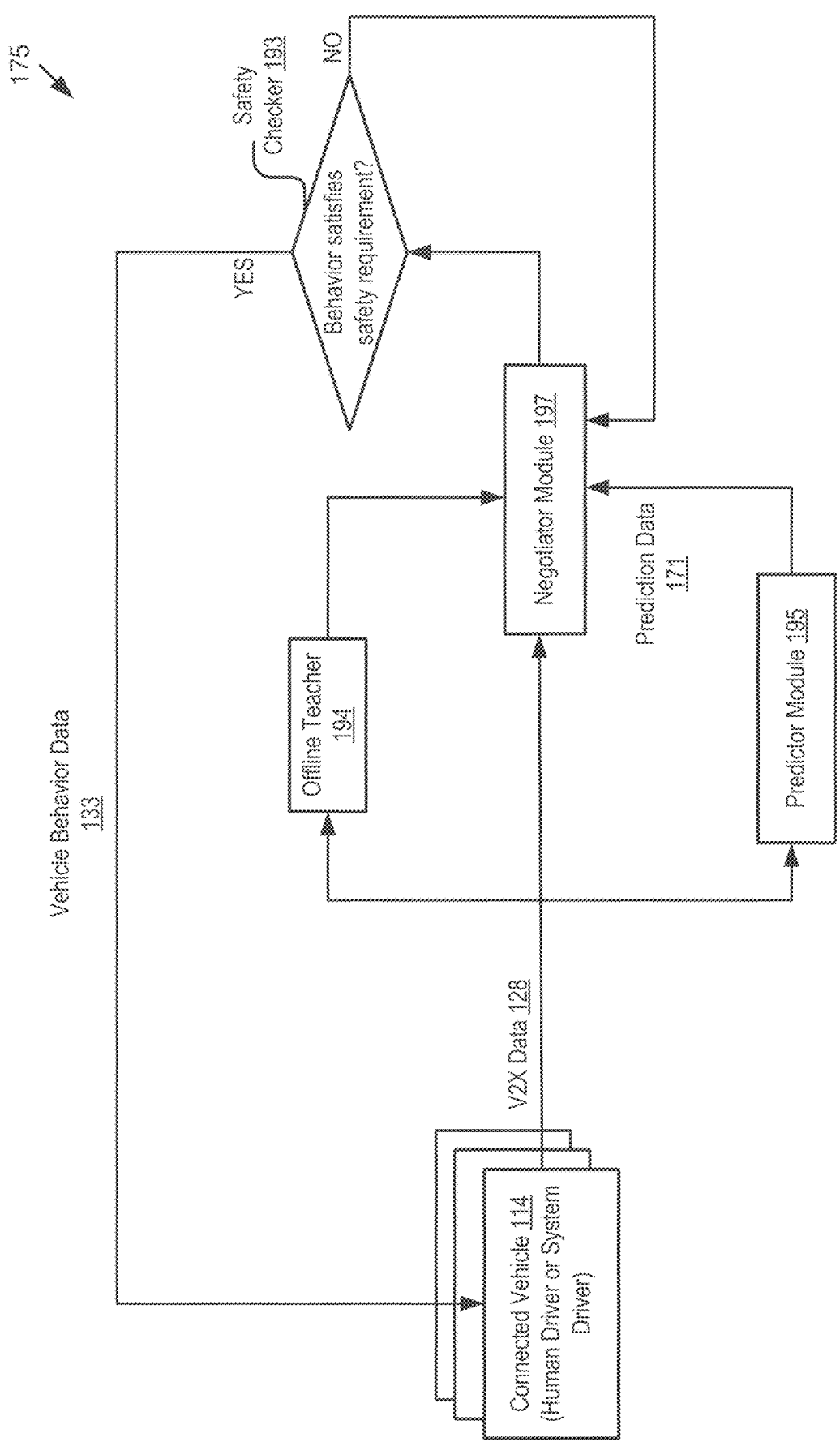
FIG. 1D is a block diagram illustrating another architecture including components of the machine learning system and one or more connected vehicles according to some embodiments.

FIG. 1D is a block diagram illustrating another architecture 175 including components of the machine learning system 191 and one or more connected vehicles 114 according to some embodiments. Here, the machine learning system 191 additionally includes an offline teacher 194 and a safety checker 193.

In some embodiments, it may take a long time for optimization mechanisms to produce an optimized solution. Then, the offline teacher 194 can be added offline for applying optimization mechanisms as an offline teacher of the negotiator module 197. In this case, the negotiator module 197 may be implemented with a machine learning algorithm. To ensure safety of the produced vehicle behaviors, the safety checker 193 is added to check whether the overall optimum behavior of the region or any individual optimum behavior produced by the negotiator module 197 is safe. For example, the safety checker 193 determines whether an individual optimum behavior for a particular connected vehicle 114 satisfies a safety requirement in the region. If the individual optimum behavior satisfies the safety requirement, the safety checker 193 transmits vehicle behavior data 133 describing the individual optimum behavior to the particular connected vehicle 114. Otherwise, the safety checker 193 does not transmit the vehicle behavior data 133 and instructs the negotiator module 197 to regenerate the individual optimum behavior for this particular connected vehicle 114 again.

The predictor module 195 and the negotiator module 197 are described above with reference to FIGS. 1B-1C, and so, similar description will not be repeated here.

With combined reference to FIGS. 1A-1D described above and FIGS. 2-7D described below, the machine learning system 191 and the machine learning client 199 can minimize an overall risk of violations of fundamental driving requirements. The machine learning system 191 and the machine learning client 199 can maximize a fulfillment of customized needs of different vehicles (e.g., maximizing an overall intentions of the vehicles). In addition, the machine learning system 191 and the machine learning client 199 can customize the priority of the vehicles based on their driving intentions (or driving preferences) and weights for the driving intentions (or driving preferences).

Example Computer System

Figure 2:
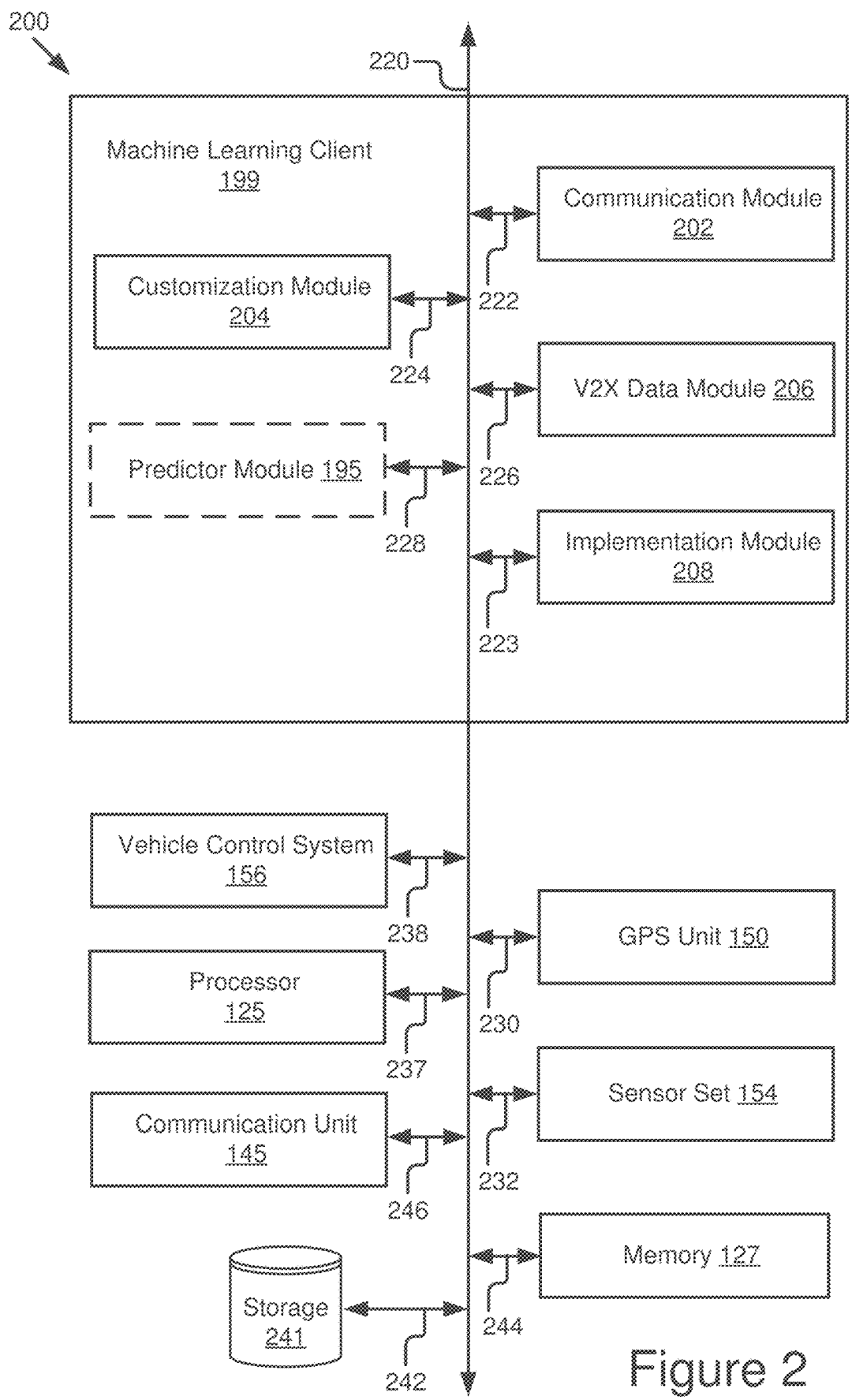
FIG. 2 is a block diagram illustrating an example computer system including the machine learning client according to some embodiments.

Referring now to FIG. 2, depicted is a block diagram illustrating an example computer system 200 including the machine learning client 199 according to some embodiments. In some embodiments, the computer system 200 may include a special-purpose computer system that is programmed to perform one or more steps of the method 300 described below with reference to FIG. 3.

In some embodiments, the computer system 200 may be an element of a connected vehicle 114 (e.g., the ego vehicle 110 or the remote vehicle 112). In some embodiments, the computer system 200 may be an onboard vehicle computer of the connected vehicle 114. In some embodiments, the computer system 200 may include an engine control unit, head unit or some other processor-based computing device of the connected vehicle 114.

The computer system 200 may include one or more of the following elements according to some examples: the machine learning client 199; the processor 125; and the communication unit 145. The computer system 200 may further include one or more of the following elements: the sensor set 154; the GPS unit 150; the memory 127; the vehicle control system 156; and a storage 241. The components of the computer system 200 are communicatively coupled by a bus 220.

In the illustrated embodiment, the processor 125 is communicatively coupled to the bus 220 via a signal line 237. The vehicle control system 156 is communicatively coupled to the bus 220 via a signal line 238. The communication unit 145 is communicatively coupled to the bus 220 via a signal line 246. The sensor set 154 is communicatively coupled to the bus 220 via a signal line 232. The GPS unit 150 is communicatively coupled to the bus 220 via a signal line 230. The storage 241 is communicatively coupled to the bus 220 via a signal line 242. The memory 127 is communicatively coupled to the bus 220 via a signal line 244.

The following elements are described above with reference to FIG. 1A: the processor 125; the communication unit 145; the sensor set 154; the GPS unit 150; the vehicle control system 156; and the memory 127. Those descriptions will not be repeated here.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media (e.g., a hard disk drive, a floppy disk drive, a flash memory device, etc.) for storing information on a more permanent basis.

In the illustrated embodiment shown in FIG. 2, the machine learning client 199 includes: a communication module 202; a customization module 204; a V2X data module 206; and an implementation module 208. In some embodiments, the machine learning client 199 further includes the predictor module 195. These components of the machine learning client 199 are communicatively coupled to each other via the bus 220. In some embodiments, components of the machine learning client 199 can be stored in a single server or device. In some other embodiments, components of the machine learning client 199 can be distributed and stored across multiple servers or devices.

The communication module 202 can be software including routines for handling communications between the machine learning client 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 100. For example, the communication module 202 receives or transmits, via the communication unit 145, V2X data of other vehicles or V2X data of the connected vehicle 114. The communication module 202 may send or receive any of the data or messages described above with reference to FIGS. 1A-1D via the communication unit 145.

In some embodiments, the communication module 202 receives data from the other components of the machine learning client 199 and stores the data in one or more of the storage 241 and the memory 127. The other components of the machine learning client 199 may cause the communication module 202 to communicate with the other elements of the computer system 200 or the operating environment 100 (via the communication unit 145). For example, the V2X data module 206 may use the communication module 202 to communicate with the sensor set 154 and cause the sensor set 154 to record sensor data.

The customization module 204 can be software including routines for generating customized data of the connected vehicle 114. In some embodiments, the customization module 204 can be stored in the memory 127 of the computer system 200 and can be accessible and executable by the processor 125. The customization module 204 may be adapted for cooperation and communication with the processor 125 and other components of the computer system 200 via a signal line 224.

In some embodiments, the customization module 204 is operable to generate customized data that describes a customized need of the connected vehicle 114. For example, the customization module 204 may determine the customized need of the connected vehicle 114 based on one or more user inputs or historical travel data of the connected vehicle 114. The customized need of the connected vehicle 114 may be described by one or more customized parameters and one or more weights for the one or more customized parameters. For example, the one or more customized parameters include one or more of a driving intention and a driving preference associated with the connected vehicle 114. The customized need may be described by one or more of: (1) the driving intention and a weight for the driving invention; and (2) the driving preference and a weight for the driving preference.

In some embodiments, the customization module 204 sends the generated customized data to the V2X data module 206.

The V2X data module 206 can be software including routines for generating V2X data of the connected vehicle 114. In some embodiments, the V2X data module 206 can be stored in the memory 127 of the computer system 200 and can be accessible and executable by the processor 125. The V2X data module 206 may be adapted for cooperation and communication with the processor 125 and other components of the computer system 200 via a signal line 226.

In some embodiments, the V2X data module 206 causes the sensor set 154 and ADAS systems of the connected vehicle 114 to collect sensor and ADAS data. Optionally, the predictor module 195 is installed in the machine learning client 199 of the connected vehicle 114. The V2X data module 206 causes the predictor module 195 to analyze the sensor and ADAS data of the connected vehicle 114 and to estimate a future behavior of the connected vehicle 114 by comparison to the past behaviors of the connected vehicle 114. The predictor module 195 sends data describing the future behavior of the connected vehicle 114 to the V2X data module 206.

The V2X data module 206 is operable to generate V2X data of the connected vehicle 114. In some embodiments, the V2X data includes the customized data describing the customized need of the connected vehicle 114. For example, the V2X data includes one or more of: parameter data describing the one or more customized parameters (e.g., a driving intention or a driving preference, etc.) and weight data describing the one or more weights for the one or more customized parameters.

In some embodiments, the V2X data further includes the sensor and ADAS data. For example, the V2X data further includes data describing a roadway environment surrounding the connected vehicle 114 and data describing a vehicle state of the connected vehicle 114. In some embodiments, the V2X data further includes one or more of the following: data describing a design specification of the connected vehicle 114; and data describing the future behavior of the connected vehicle 114.

The V2X data module 206 causes the communication unit 145 to transmit a feedback message via a V2X network, and the feedback message includes the V2X data of the connected vehicle 114 as its payload.

The predictor module 195 can be software including routines for predicting a future behavior of the connected vehicle 114. In some embodiments, the predictor module 195 can be stored in the memory 127 of the computer system 200 and can be accessible and executable by the processor 125. The predictor module 195 may be adapted for cooperation and communication with the processor 125 and other components of the computer system 200 via a signal line 228.

The predictor module 195 is described above with reference to FIG. 1B. Similar description will not be repeated here.

The implementation module 208 can be software including routines for implementing an individual optimum behavior for the connected vehicle 114. In some embodiments, the implementation module 208 can be stored in the memory 127 of the computer system 200 and can be accessible and executable by the processor 125. The implementation module 208 may be adapted for cooperation and communication with the processor 125 and other components of the computer system 200 via a signal line 223.

In some embodiments, the implementation module 208 receives a modification message from the machine learning system 191 and parses out vehicle behavior data of the connected vehicle 114 from the modification message. The vehicle behavior data describes an individual optimum behavior for the connected vehicle 114. The implementation module 208 modifies an operation of the vehicle control system 156 of the connected vehicle 114 based on the vehicle behavior data so that the connected vehicle 114 implements the individual optimum behavior. For example, the implementation module 208 modifies an operation of the vehicle control system 156 based on the vehicle behavior data so that the connected vehicle 114 is controlled to operate in conformity with the individual optimum behavior.

In some embodiments, an implementation of the individual optimum behavior by the connected vehicle 114 contributes to an achievement of an overall optimum behavior of a region where the connected vehicle 114 is located. Meanwhile, the implementation of the individual optimum behavior also enables the customized need of the connected vehicle to be satisfied.

In some embodiments, the implementation of the individual optimum behavior by the connected vehicle 114 indicates no collision occurs between the connected vehicle 114 and one or more other vehicles in the region. Also, the implementation of the individual optimum behavior by the connected vehicle 114 indicates the customized need of the connected vehicle 114 is satisfied without interference on one or more customized needs of the one or more other vehicles.

In some embodiments, the connected vehicle 114 and the one or more other vehicles are included in a group of vehicles in the region. The achievement of the overall optimum behavior of the region indicates: (1) no collision occurs to any vehicle in the group; and (2) a customized need of each vehicle in the group is satisfied without modifying that of any other vehicle in the group.

In some embodiments, the individual optimum behavior includes one or more of an enforced trajectory, an acceleration setting, a steering-angle setting and a speed setting for the connected vehicle 114 that are optimized for the connected vehicle 114. In some embodiments, the individual optimum behavior satisfies one or more of a traffic rule requirement and a safety requirement in the region.

Example Processes

Figure 3:
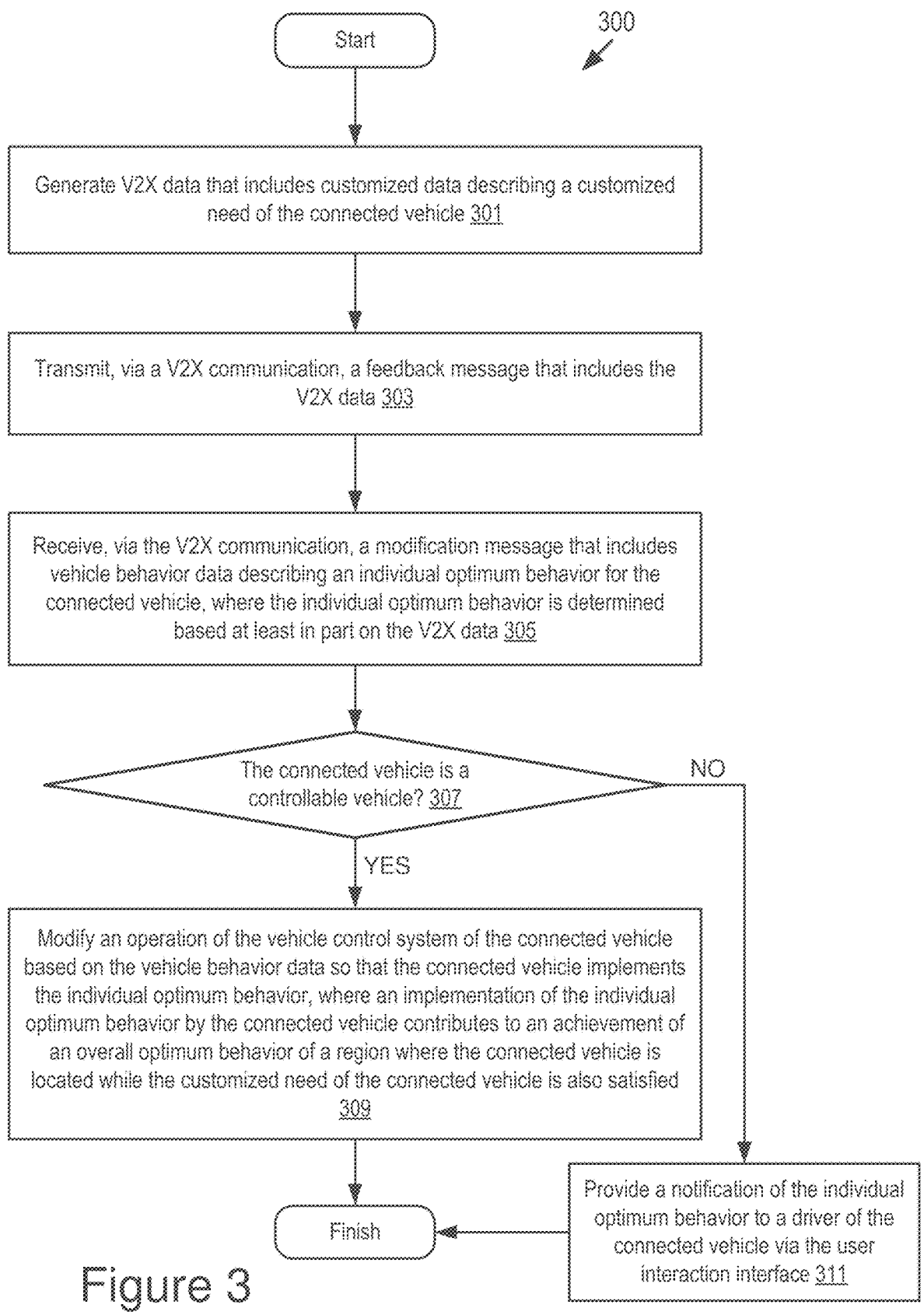
FIG. 3 depicts a method for implementing an individual optimum behavior on a connected vehicle according to some embodiments.

Referring now to FIG. 3, depicted is a flowchart of an example method 300 for implementing an individual optimum behavior on a connected vehicle 114 according to some embodiments. The steps of the method 300 are executable in any order, and not necessarily the order depicted in FIG. 3. The connected vehicle 114 can be the ego vehicle 110 or the remote vehicle 112. The method 300 may be executed by the machine learning client 199 of the connected vehicle 114.

At step 301, the V2X data module 206 generates V2X data that includes customized data describing a customized need of the connected vehicle 114.

At step 303, the V2X data module 206 transmits, via a V2X communication, a feedback message that includes the V2X data.

At step 305, the implementation module 208 receives, via the V2X communication, a modification message that includes vehicle behavior data describing an individual optimum behavior for the connected vehicle 114. For example, the individual optimum behavior is determined based at least in part on the V2X data of the connected vehicle 114 by the machine learning system 191.

At step 307, the implementation module 208 determines whether the connected vehicle 114 is a controllable vehicle. Responsive to the connected vehicle 114 being a controllable vehicle, the method 300 moves to step 309. Otherwise, the method 300 moves to step 311.

For example, the implementation module 208 determines whether the connected vehicle 114 is controlled by the vehicle control system 156. Responsive to the connected vehicle 114 being controlled by the vehicle control system 156, the method 300 moves to step 309. Responsive to the connected vehicle 114 being controlled by a human driver, the method 300 moves to step 311.

At step 309, the implementation module 208 modifies an operation of the vehicle control system 156 of the connected vehicle 114 based on the vehicle behavior data so that the connected vehicle 114 implements the individual optimum behavior. Here, an implementation of the individual optimum behavior by the connected vehicle 114 contributes to an achievement of an overall optimum behavior of a region where the connected vehicle 114 is located. Meanwhile, the customized need of the connected vehicle 114 is also satisfied through the implementation of the individual optimum behavior.

At step 311, the implementation module 208 provides a notification of the individual optimum behavior to the human driver of the connected vehicle 114 via the user interaction interface 161. In this way, the human driver may follow instructions provided by the notification so that the individual optimum behavior of the connected vehicle 114 is also implemented.

Figure 4:
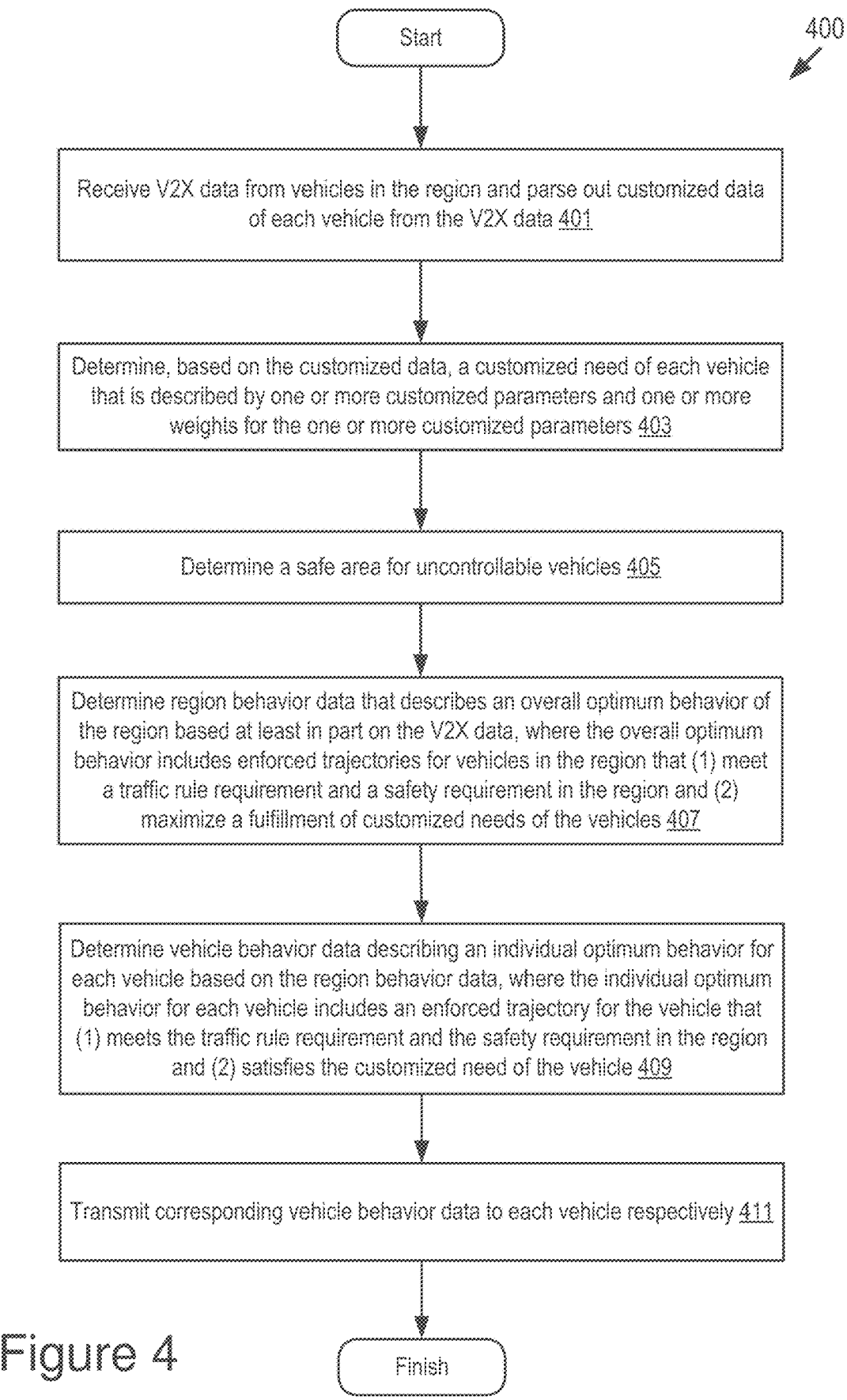
FIG. 4 depicts a method for providing an overall optimum behavior in a region as well as individual optimum behaviors for vehicles in the region according to some embodiments.

FIG. 4 depicts a method 400 for providing an overall optimum behavior in a region as well as individual optimum behaviors for vehicles in the region according to some embodiments. The steps of the method 400 are executable in any order, and not necessarily the order depicted in FIG. 4. The method 400 may be executed by the machine learning system 191 that can be installed in a cloud server, an edge server, a roadside unit, the ego vehicle 110 or any other endpoint on the roadway.

At step 401, the negotiator module 197 of the machine learning system 191 receives V2X data from vehicles in the region and parses out customized data of each vehicle from the V2X data.

At step 403, the negotiator module 197 determines, based on the customized data, a customized need of each vehicle that is described by one or more customized parameters and one or more weights of the one or more customized parameters. For example, based on the customized data of each vehicle, the negotiator module 197 determines one or more of the following: a driving preference and a weight for the driving preference; and a driving intention and a weight for the driving intention.

At step 405, the negotiator module 197 determines a safe area for uncontrollable vehicles in the region. An uncontrollable vehicle may be a vehicle that is not controlled by the vehicle control system. For example, the uncontrollable vehicle does not automatically implement an individual optimum behavior generated by the machine learning system 191.

For example, the negotiator module 197 may reserve an area where the uncontrollable vehicles are present as a safe area for the uncontrollable vehicles. In some embodiments, other controllable vehicles are kept out from the safe area of the uncontrollable vehicles.

At step 407, the negotiator module 197 determines region behavior data that describes an overall optimum behavior of the region based at least in part on the V2X data. The overall optimum behavior includes enforced trajectories for vehicles (e.g., controllable vehicles, uncontrollable vehicles, or both) in the region. An implementation of these enforced trajectories (1) meet a traffic rule requirement and a safety requirement in the region and (2) maximize a fulfillment of customized needs of the vehicles.

For example, the negotiator module 197 determines whether a safety requirement in the region can be satisfied by modifying trajectories of controllable vehicles in the region. Responsive to the safety requirement being satisfied by modifying the trajectories of the controllable vehicles in the region, the negotiator module 197 modifies the trajectories of the controllable vehicles in the region to generate enforced trajectories for the controllable vehicles. In this case, the overall optimum behavior includes enforced trajectories for the controllable vehicles in the region. However, responsive to the safety requirement being not satisfied by modifying the trajectories of the controllable vehicles, the negotiator module 197 modifies the trajectories of all vehicles (whether they are controllable or uncontrollable vehicles) in the region. The negotiator module 197 generates enforced trajectories for all the vehicles. In this case, the overall optimum behavior includes enforced trajectories for the controllable and uncontrollable vehicles in the region.

At step 409, the negotiator module 197 determines vehicle behavior data describing an individual optimum behavior for each vehicle based on the region behavior data. The individual optimum behavior for each vehicle includes an enforced trajectory for the vehicle that (1) meets the traffic rule requirement and the safety requirement and (2) satisfies the customized need of the vehicle without modifying customized needs of other vehicles.

For example, the negotiator module 197 may modify a trajectory included in a driving intention of a vehicle to generate an enforced trajectory for the vehicle based on the region behavior data. An implementation of the enforced trajectory by the vehicle contributes to an achievement of the overall optimum behavior of the region while a customized need of the vehicle is also satisfied.

At step 411, the negotiator module 197 transmits corresponding vehicle behavior data describing an individual optimum behavior of each vehicle to the vehicle respectively.

Figure 5A:
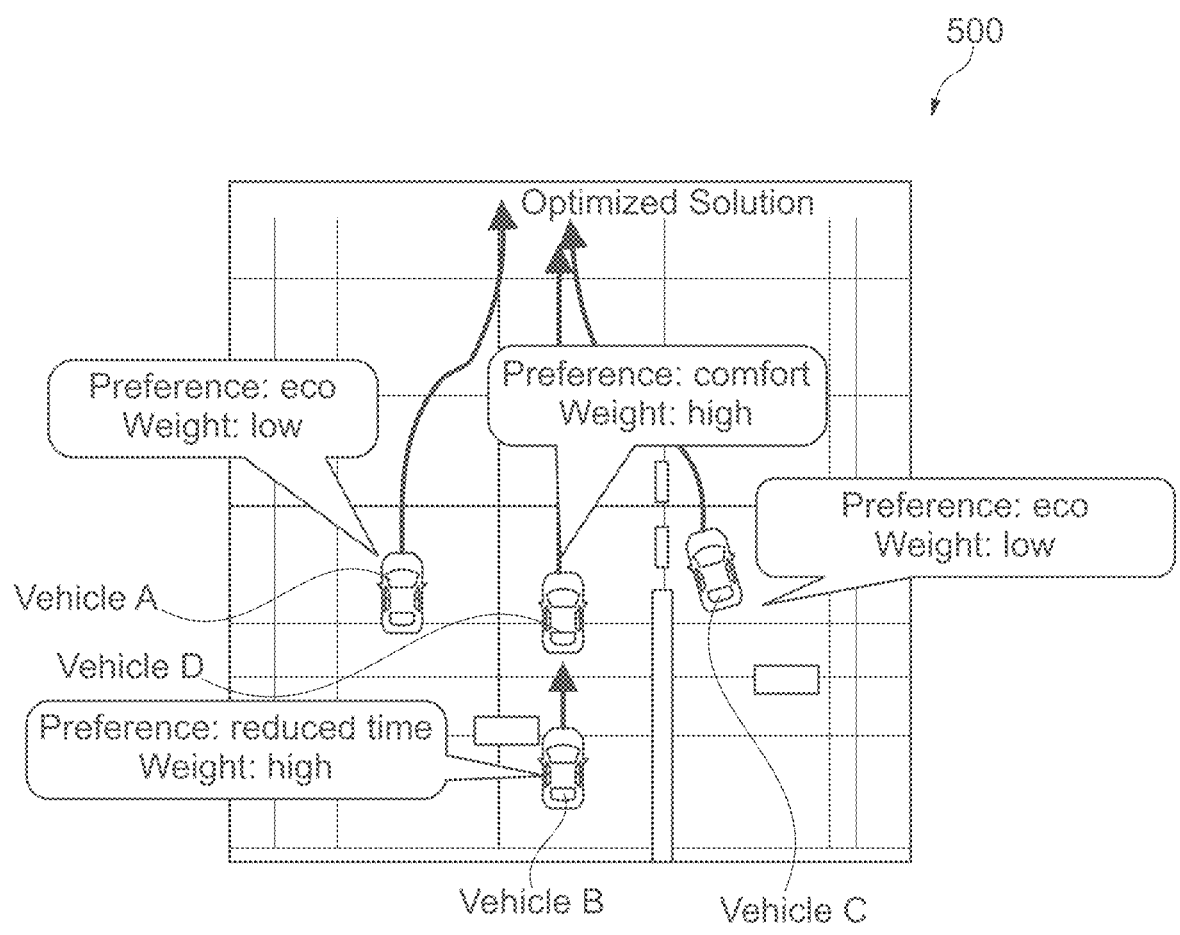
FIGS. 5A-5B are graphical representations illustrating an example operation scenario for providing optimum vehicle behaviors according to some embodiments.
Figure 5B:
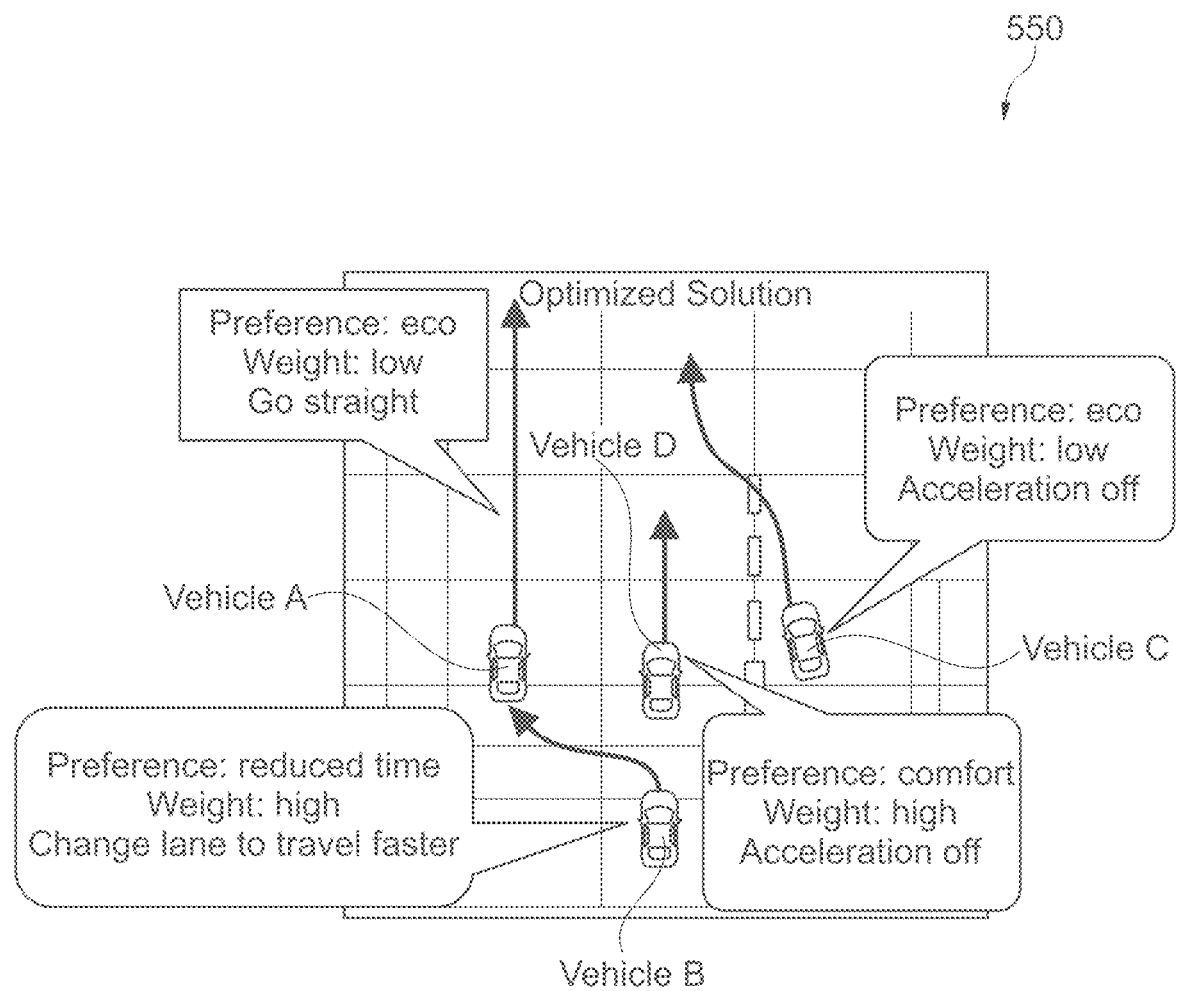

FIGS. 5A-5B are graphical representations 500 and 550 illustrating an example operation scenario for providing optimum vehicle behaviors according to some embodiments. In this operation scenario, there are four vehicles (Vehicles A, B, C and D) on a roadway. Each of the vehicles may include an instance of the machine learning client 199.

Referring to FIG. 5A, Vehicle A has a driving preference of economy of fuel consumption (e.g., "eco") with a "low" weight. Vehicle A has a planned trajectory to change to its right lane where Vehicles D and B are currently present. Vehicle B has a driving preference of a reduced time with a "high" weight and a planned trajectory to go straight ahead. Vehicle C has a driving preference of economy of fuel consumption with a "low" weight and a planned trajectory to merge to its left lane. Vehicle D has a driving preference of "comfort" with a "high" weight and a planned trajectory to go straight ahead. These vehicles may send V2X data (including data describing their driving preferences, weights for the driving preferences and planned trajectories, etc.) to the machine learning system 191 via feedback messages, respectively.

As shown in FIG. 5A, if Vehicles A-D travel according to their respective planned trajectories, these vehicles may meet one another on a same lane and potential collisions may occur.

The machine learning system 191 may determine an overall optimum behavior for Vehicles A-D based at least in part on the V2X data received from these vehicles. An achievement of the overall optimum behavior may ensure that (1) there is no collision among any of Vehicles A-D and (2) meanwhile the driving preferences of Vehicles A-D are also satisfied. The machine learning system 191 determines an individual optimum behavior for each of the vehicles so that the overall optimum behavior is achieved in the region. The machine learning system 191 sends vehicle behavior data describing an individual optimum behavior of each respective vehicle via a modification message.

Referring to FIG. 5B, the individual optimum behavior for Vehicle A includes modifying its planned trajectory ("changing to its right lane") to an enforced trajectory of "going straight." Responsive to receiving vehicle behavior data describing the individual optimum behavior, Vehicle A operates in conformity with the enforced trajectory of "going straight" accordingly.

The individual optimum behavior for Vehicle B includes modifying its planned trajectory ("going straight ahead") to an enforced trajectory of "changing to its left lane to travel faster." Responsive to receiving vehicle behavior data describing the individual optimum behavior, Vehicle B operates in conformity with the enforced trajectory of "changing to its left lane to travel faster" accordingly.

The individual optimum behavior for Vehicle C includes merging smoothly to its left lane. Responsive to receiving vehicle behavior data describing the individual optimum behavior, Vehicle C merges smoothly to its left lane.

The individual optimum behavior for Vehicle D includes traveling on its planned trajectory with acceleration off. Responsive to receiving vehicle behavior data describing the individual optimum behavior, Vehicle D turns off its acceleration.

Figure 6A:
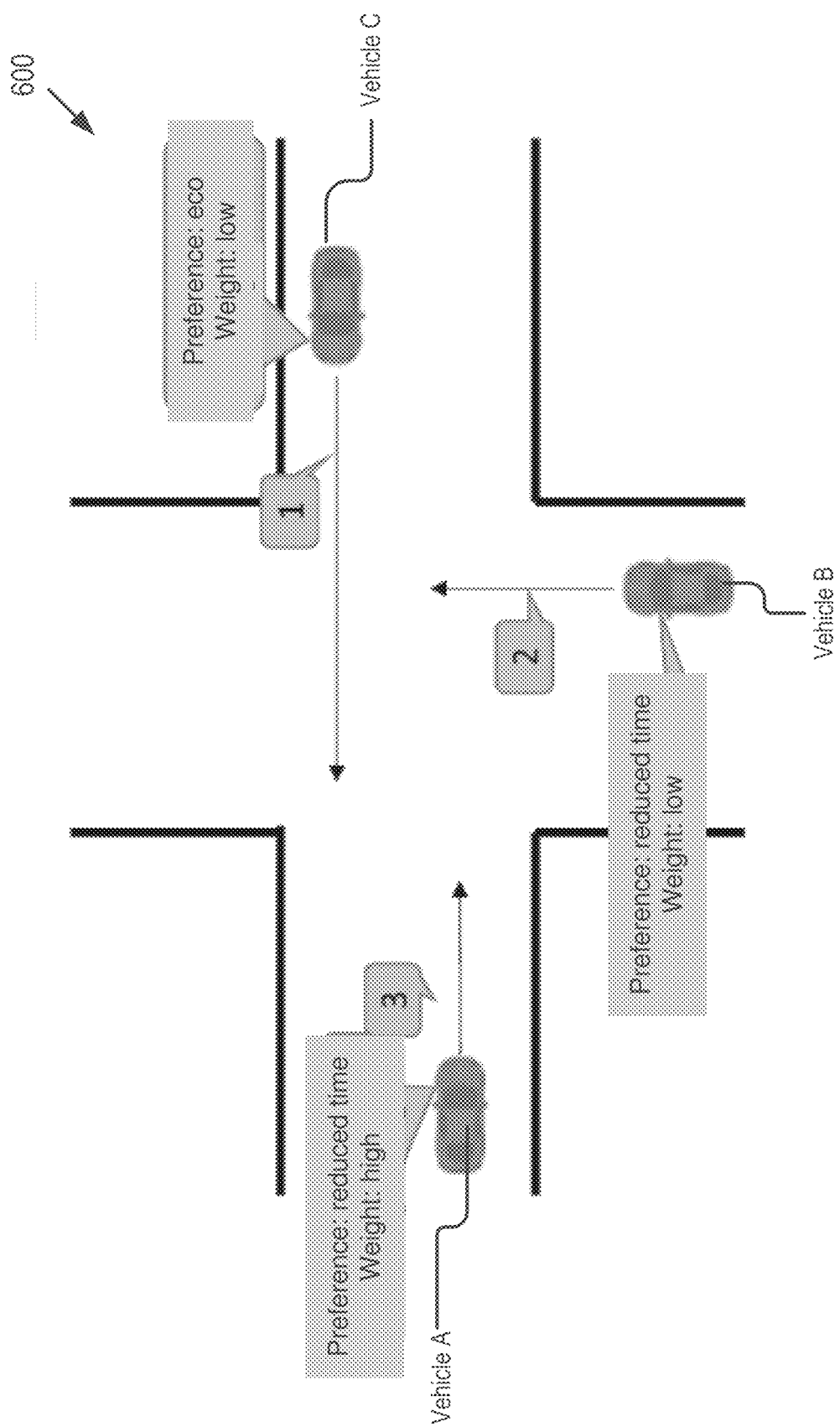
FIGS. 6A-6B are graphical representations illustrating another example operation scenario for providing optimum vehicle behaviors according to some embodiments.
Figure 6B:
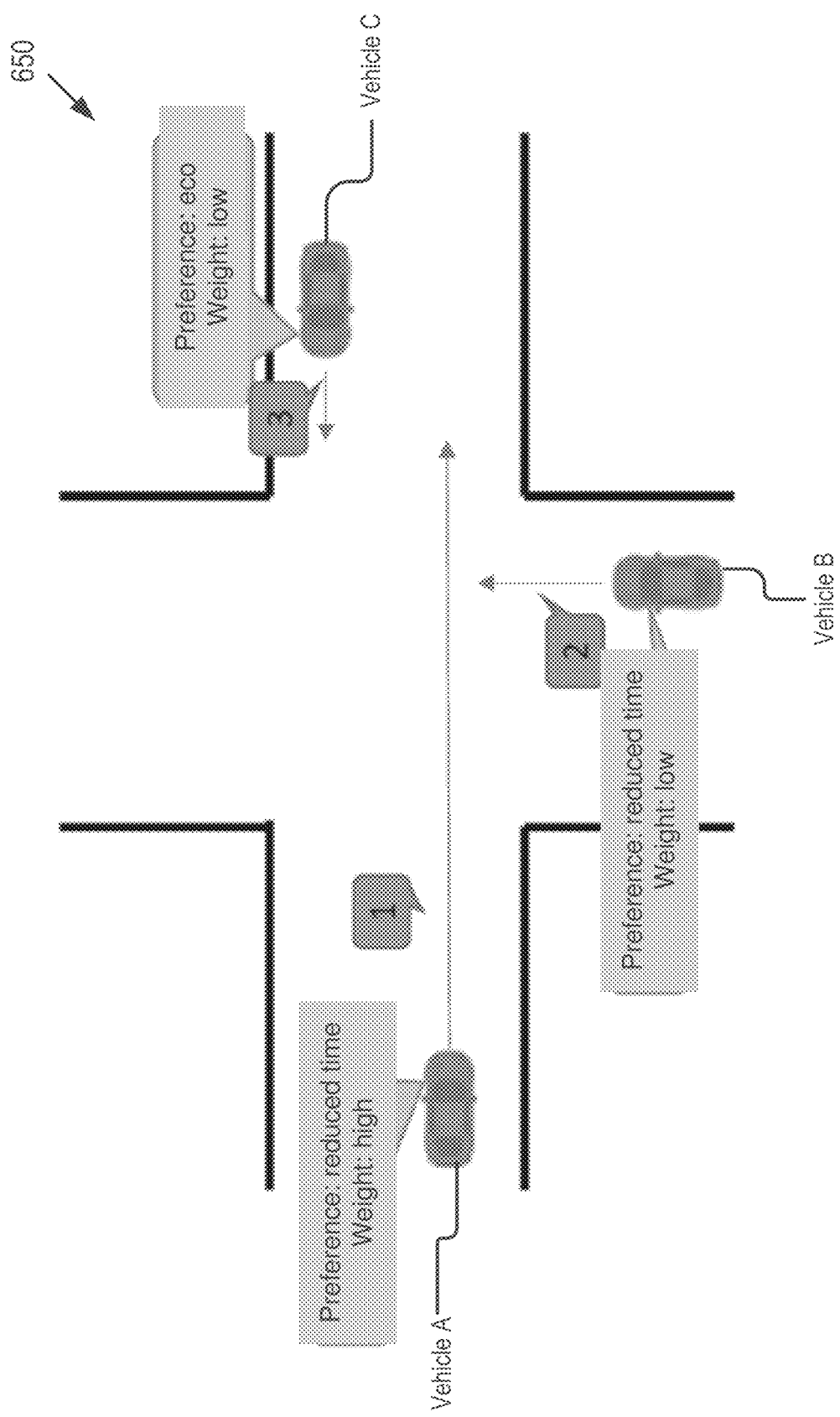

FIGS. 6A-6B are graphical representations 600 and 650 illustrating another example operation scenario for providing optimum vehicle behaviors according to some embodiments. In this operation scenario, there are three vehicles (Vehicles A, B and C) at an intersection. Each of the vehicles may include an instance of the machine learning client 199.

Referring to FIG. 6A, Vehicle A has a driving preference of a reduced time with a "high" weight. Vehicle B has a driving preference of a reduced time with a "low" weight. Vehicle C has a driving preference of economy of fuel consumption with a "low" weight. Vehicles A-C each have a planned trajectory to go straight ahead. These vehicles may send V2X data (including data describing their driving preferences, weights for the driving preferences and planned trajectories, etc.) to the machine learning system 191 via feedback messages, respectively.

As shown in FIG. 6A, if Vehicles A-C travel according to their respective planned trajectories, these vehicles may meet one another at the intersection and potential collisions may occur.

The machine learning system 191 may determine an overall optimum behavior for Vehicles A-C based at least in part on the V2X data received from these vehicles. An achievement of the overall optimum behavior may ensure that (1) there is no collision among any of Vehicles A-C and (2) meanwhile the driving preferences of Vehicles A-C are also satisfied.

Referring to FIG. 6B, because the driving preferences for Vehicles A and B are "a reduced time" while the driving preference for Vehicle C is "eco," the machine learning system 191 may instruct Vehicles A and B to pass over the intersection before Vehicle C. Because the weight for the driving preference of Vehicle A is higher than the weight for the driving preference of Vehicle B, the machine learning system 191 may instruct Vehicle A to pass over the intersection before Vehicle B.

Then, the machine learning system 191 determines individual optimum behaviors for Vehicles A-C so that Vehicle A passes over the intersection first, Vehicle B passes over the intersection next and Vehicle C passes over the intersection at last. The machine learning system 191 sends vehicle behavior data describing the individual optimum behaviors to Vehicles A-C respectively so that these vehicles can implement their respective individual optimum behaviors accordingly.

Figure 7A:
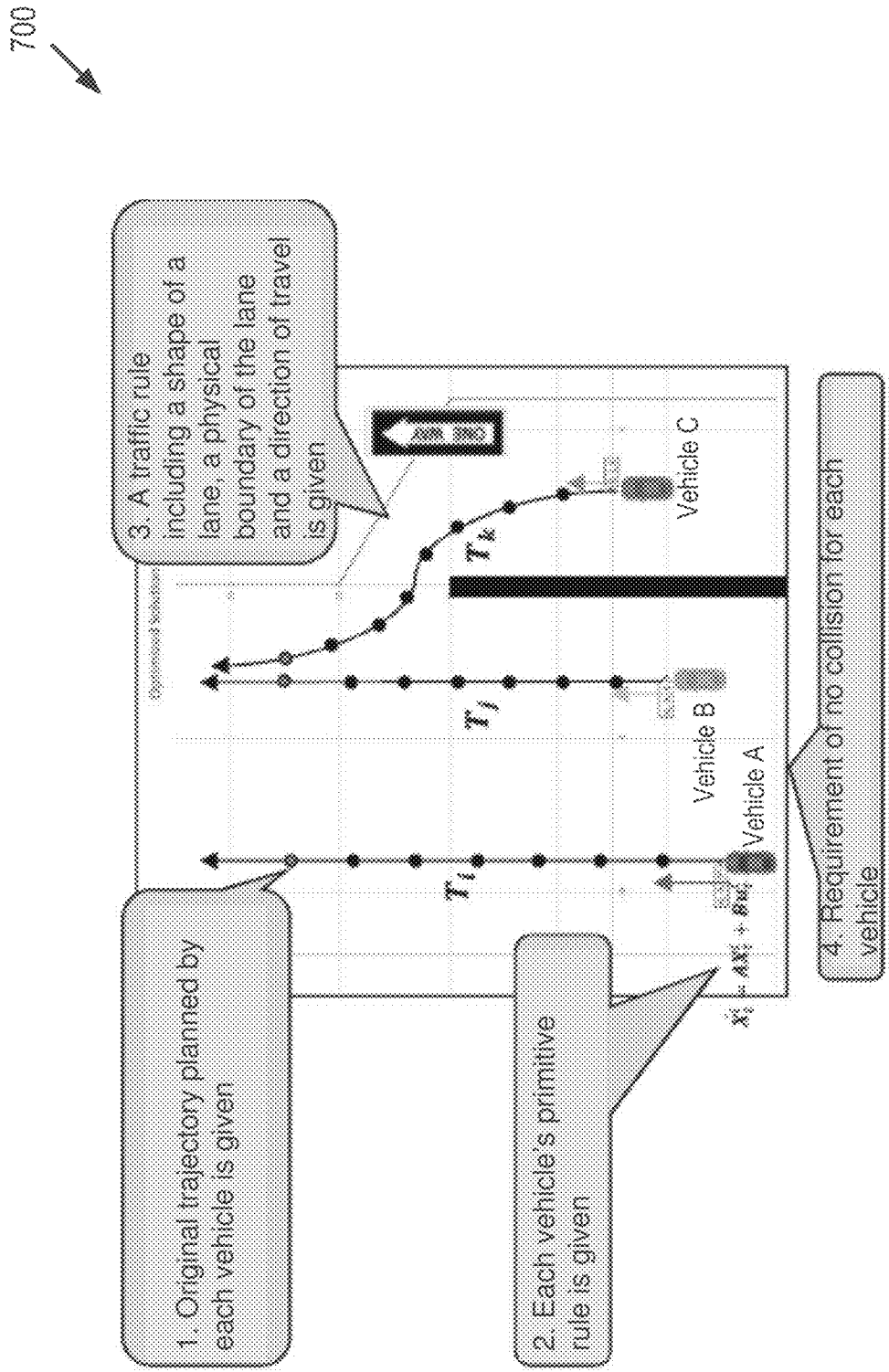
FIGS. 7A-7B are graphical representations illustrating an example simulation that provides optimum vehicle behaviors according to some embodiments.
Figure 7B:
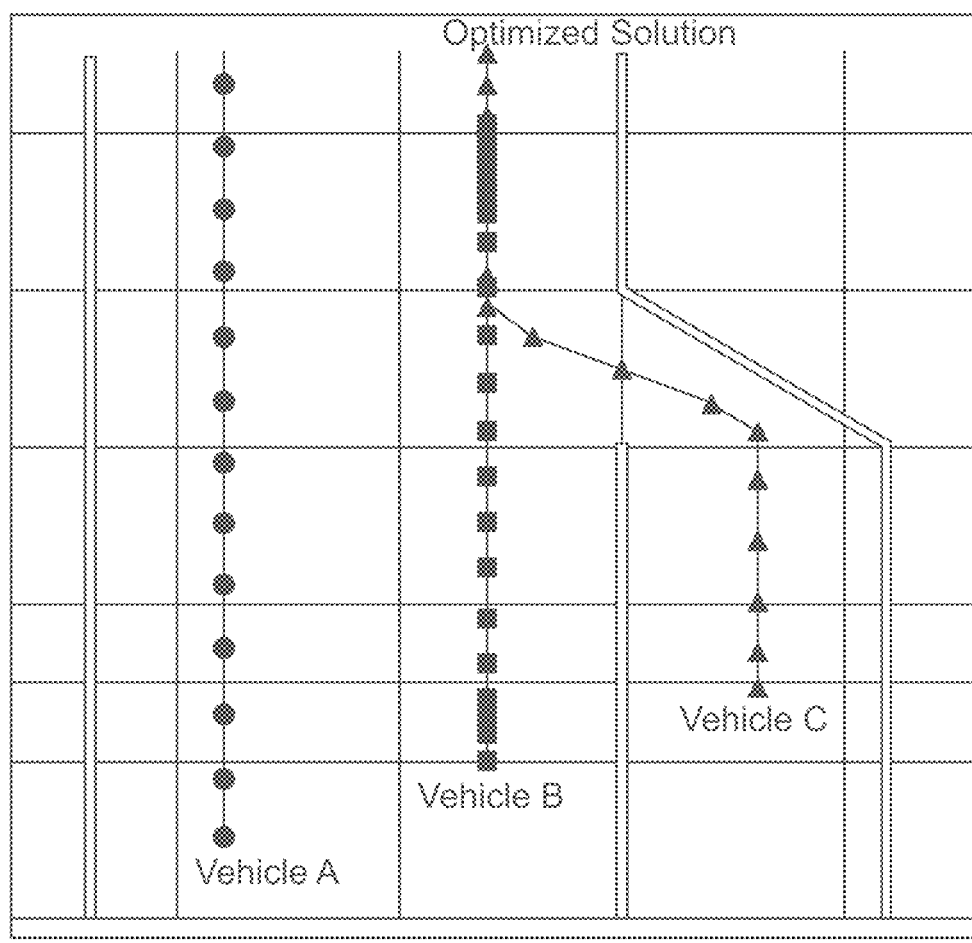

FIGS. 7A-7B are graphical representations 700 and 710 illustrating an example simulation that provides optimum vehicle behaviors according to some embodiments. Three vehicles (Vehicles A, B and C) are present in the simulation.

In some embodiments, the negotiator module 197 of the machine learning system 191 determines individual optimum behaviors for the vehicles using an optimization mechanism. In the optimization mechanism, one or more constraints are configured so that fundamental driving requirements are satisfied. An objective of the optimization mechanism includes maximizing a fulfillment of customized needs of the vehicles. For example, an objective of the optimization mechanism may include one or more of minimizing an arrival time, minimizing fuel consumption, minimizing jerk, and maximizing comfort experience, etc.

For example, assume that a driving preference of Vehicle A is a reduced travel time with a weight $W_A$, a driving preference of Vehicle B is economy for fuel consumption with a weight $W_B$, and a driving preference of Vehicle C is a comfort experience with a weight $W_C$. Then, an objective of the optimization mechanism may include minimizing an arrival time of Vehicle A weighted by the weight $W_A$, minimizing fuel consumption of Vehicle B weighted by the weight $W_B$, and maximizing the comfort experience of Vehicle C weighted by the weight $W_C$.

The negotiator module 197 considers one or more of the following factors (1)-(7) when applying the optimization mechanism. Factor (1) includes a trajectory planned by each vehicle ("planned trajectory"). Factor (2) includes one or more primitive rules that the trajectory of the vehicle needs to follow (e.g., an equation of motion, a speed limit, a force limit, etc.). Factor (3) includes one or more traffic rules to follow (e.g., each vehicle stays in a correct lane and a correct direction, each vehicle needs to follow the speed limit, etc.). A traffic rule may describe, for example, a shape of a lane, a physical boundary of the lane, and a direction of travel, etc. Factor (4) includes no collision of the vehicle with adjacent vehicles (e.g., sufficient space needs to be kept between adjacent vehicles). Factor (5) includes whether an enforced trajectory for the vehicle is possible without collision with other vehicles. Factor (6) includes whether the vehicle is controllable or uncontrollable. Factor (7) includes a requirement of no collision for any vehicles in the region.

Referring to the simulation in FIG. 7A, the negotiator module 197 takes the above factors (1)-(4) into consideration with an objective function of minimizing arrival times of the vehicles when applying the optimization mechanism. Planned trajectories of the vehicles are shown in FIG. 7A. The optimization mechanism uses mixed-integer linear programming (MILP) as a formulation for an optimization problem and applies an optimization solver (e.g., OR-tools) to solve the optimization problem. A simulation result with enforced trajectories for the vehicles is shown in FIG. 7B. The negotiator module 197 determines an enforced trajectory for each vehicle so that no collision occurs on the roadway.

Figure 7C:
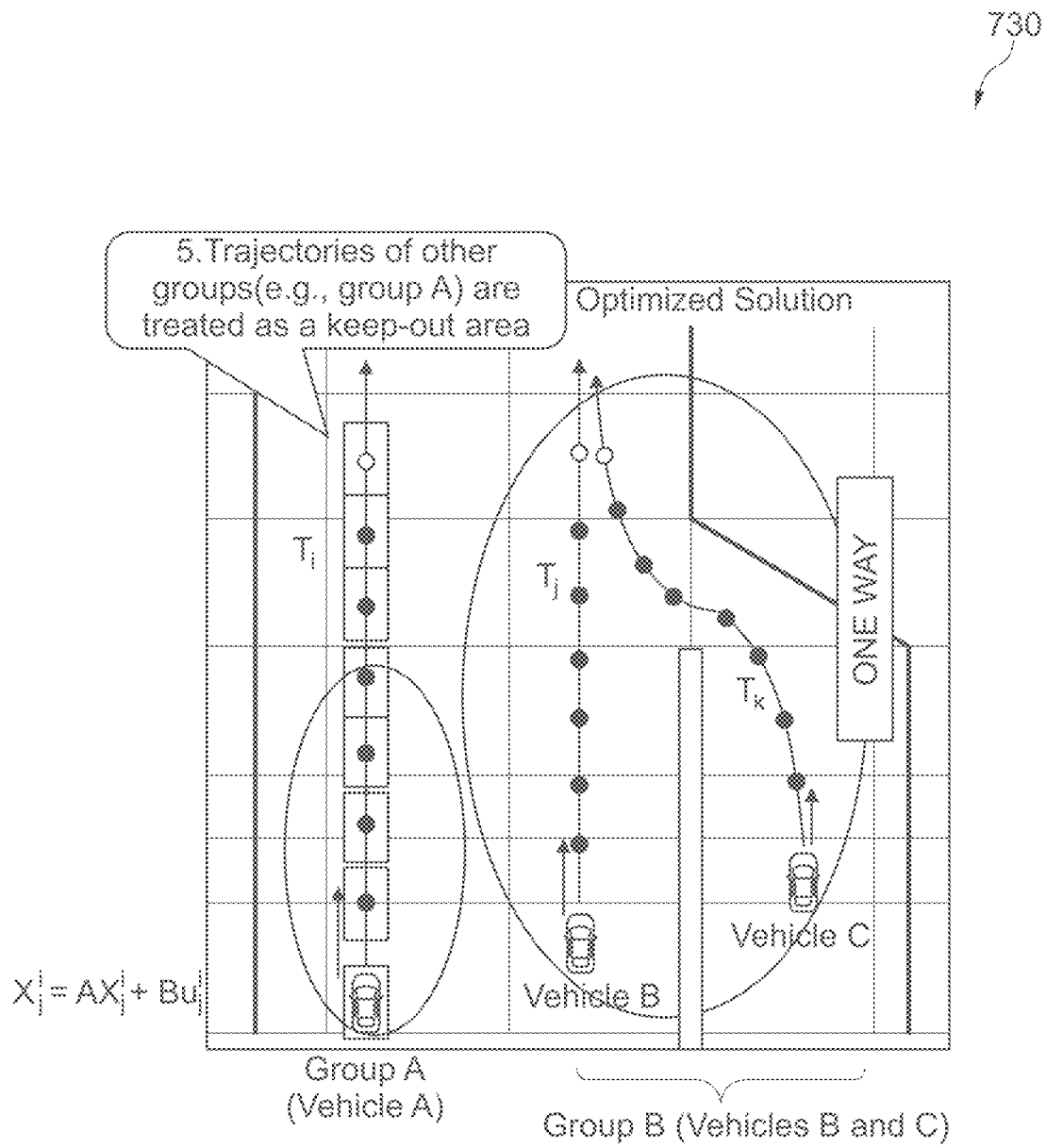
FIGS. 7C-7D are graphical representations illustrating another example simulation that provides optimum vehicle behaviors according to some embodiments.
Figure 7D:
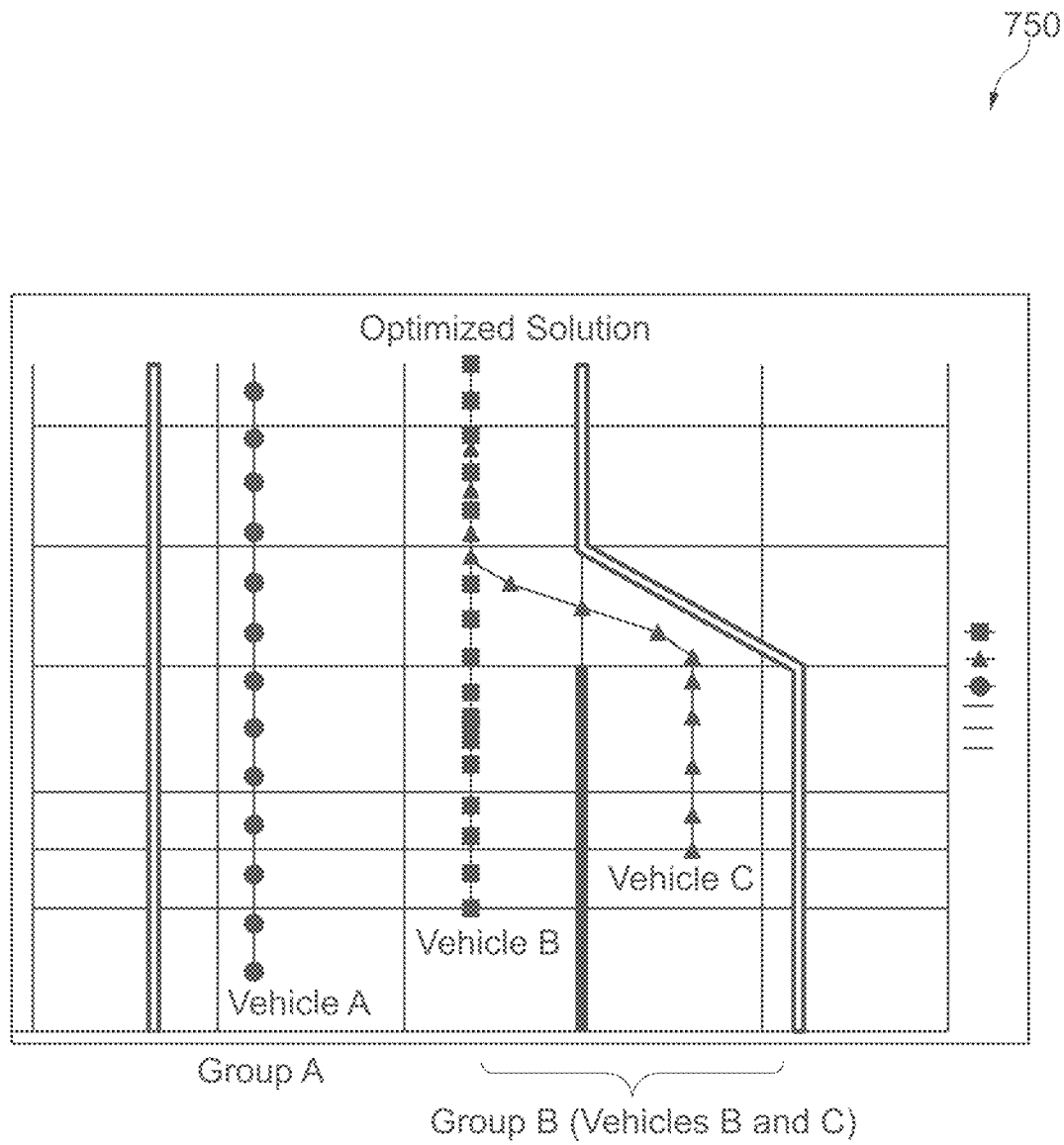

FIGS. 7C-7D are graphical representations 730 and 750 illustrating another example simulation that provides optimum vehicle behaviors according to some embodiments. Planned trajectories of Vehicles A-C are shown in FIG. 7C. The negotiator module 197 takes the above factors (1)-(4) into consideration when applying the optimization mechanism with an objective function of minimizing arrival times of the vehicles. In addition, for a particular group of vehicles under consideration, the optimization mechanism defines other groups' planned trajectories as a keep-out area for the particular group of vehicles. The optimization mechanism uses MILP as a formulation for an optimization problem and applies an optimization solver (e.g., OR-tools) to solve the optimization problem.

For example, when applying the optimization mechanism, the negotiator module 197 determines vehicles that have crossing planned trajectories (e.g., Vehicles B and C have crossing planned trajectories). The negotiator module 197 classifies the vehicles with crossing planned trajectories into a same group. For example, the negotiator module 197 classifies Vehicle A into a group A because Vehicle A does not have crossing planned trajectories with other vehicles. The negotiator module 197 classifies Vehicles B and C into a group B because they have crossing planned trajectories. Next, the negotiator module 197 excludes planned trajectories of other groups from consideration when determining enforced trajectories for a particular group (e.g., planned trajectories of other groups are considered as obstacles to the particular group). For example, the negotiator module 197 excludes the planned trajectory of Vehicle A from consideration when determining enforced trajectories for the group B.

A simulation result with enforced trajectories for the vehicles is shown in FIG. 7D. For example, the negotiator module 197 determines an enforced trajectory for Vehicle A in the group A. The negotiator module 197 also determines enforced trajectories for Vehicles B and C in the group B, respectively. No collision occurs to the vehicles. By excluding planned trajectories of other non-related vehicles (e.g., Vehicle A), it takes a shorter time to execute the optimization mechanism in FIGS. 7C-7D when compared with the simulation shown in FIGS. 7A-7B.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer program product comprising a non-transitory memory storing computer-executable code that, when executed by a processor, causes the processor to:
   receive, by an ego vehicle, Vehicle-to-Everything (V2X) data from a set of remote vehicles in a region, wherein the V2X data includes customized data describing (1) driving preferences of one or more different remote vehicles in the set which are uniquely identified in the V2X data and preference weights for each driving preference, the preference weights each describing how strong the corresponding driving preference is, and (2) driving intentions of the different remote vehicles in the set and intention weights for each driving intention, the intention weights each describing how strong the corresponding driving intention is;
   determine, by the ego vehicle, customized needs of individual remote vehicles within the set of remote vehicles based on the V2X data;
   determine, by the ego vehicle, a presence and identity of one or more uncontrollable vehicles within the set of remote vehicles;
   reserve, by the ego vehicle, a safe area within the region for the uncontrollable vehicles;
   determine, by the ego vehicle, an overall optimum behavior of the region based on one or more of the customized data, the customized needs of the individual remote vehicles, and the safe area;
   determine, by the ego vehicle, a set of relative weights by comparing the preference weights and the intention weights across the different remote vehicles;
   negotiate, by the ego vehicle and the set of remote vehicles using one or more wireless messages exchanged with a set of vehicle control systems included in the different remote vehicles, a set of individual behaviors of the different remote vehicles based on the customized needs of the different remote vehicles and the set of relative weights so that the overall optimum behavior of the region is achieved by the set of vehicle control systems executing of the set of individual behaviors; and
   execute operations to modify an operation of the set of vehicle control systems included in the different remote vehicles so that the set of individual behaviors is executed and the overall optimum behavior is achieved.

2. The computer program product of claim 1, wherein executing the operations results in one or more of the following: no collision occurs between the remote vehicles and one or more other vehicles in the region; and the customized need of the remote vehicles is satisfied without interference on one or more customized needs of the one or more other vehicles.

3. The computer program product of claim 1 further comprising negotiating the individual behaviors assigned to the different remote vehicles with the vehicle control systems of these different remote vehicles.

4. The computer program product of claim 1 further comprising determining the set of relative weights based on machine learning analysis.

5. A method, comprising:
receive, by an ego vehicle, Vehicle-to-Everything (V2X) data from a set of remote vehicles in a region, wherein the V2X data includes customized data describing (1) driving preferences of one or more different remote vehicles in the set which are uniquely identified in the V2X data and preference weights for each driving preference, the preference weights each describing how strong the corresponding driving preference is, and (2) driving intentions of the different remote vehicles in the set and intention weights for each driving intention, the intention weights each describing how strong the corresponding driving intention is;
determine, by the ego vehicle, customized needs of individual remote vehicles within the set of remote vehicles based on the V2X data;
determine, by the ego vehicle, a presence and identity of one or more uncontrollable vehicles within the set of remote vehicles;
reserve, by the ego vehicle, a safe area within the region for the uncontrollable vehicles;
determine, by the ego vehicle, an overall optimum behavior of the region based on one or more of the customized data, the customized needs of the individual remote vehicles, and the safe area;
determine, by the ego vehicle, a set of relative weights by comparing the preference weights and the intention weights across the different remote vehicles;
negotiate, by the ego vehicle and the set of remote vehicles using one or more wireless messages exchanged with a set of vehicle control systems included in the different remote vehicles, a set of individual behaviors of the different remote vehicles based on the customized needs of the different remote vehicles and the set of relative weights so that the overall optimum behavior of the region is achieved by the set of vehicle control systems executing of the set of individual behaviors; and
execute operations to modify an operation of the set of vehicle control systems included in the different remote vehicles so that the set of individual behaviors is executed and the overall optimum behavior is achieved.

6. The method of claim 5, wherein executing the operations results in one or more of the following: no collision occurs between the remote vehicles and one or more other vehicles in the region; and the customized need of the remote vehicles is satisfied without interference on one or more customized needs of the one or more other vehicles.

7. The method of claim 5 further comprising negotiating the individual behaviors assigned to the different remote vehicles with the vehicle control systems of these different remote vehicles.

8. The method of claim 5, wherein the customized need of the remote vehicles is described by one or more customized parameters, including the driving preferences and the driving intentions, and one or more weights for the one or more customized parameters.

9. The method of claim 5 further comprising determining the set of relative weights based on machine learning analysis.

10. The method of claim 8, further comprising:
generating the V2X data that includes one or more of parameter data describing the one or more customized parameters, weight data describing the one or more weights, sensor data of the remote vehicles and Advanced Driver Assistance System (ADAS) data of the remote vehicles.

11. The method of claim 5, further comprising:
predicting a future behavior of the remote vehicles, wherein the V2X data further includes prediction data describing the future behavior of the remote vehicles.

12. The method of claim 5, wherein the individual behavior includes one or more of an enforced trajectory, an acceleration setting, a steering-angle setting and a speed setting for the remote vehicles that are optimized for the remote vehicles.

13. The method of claim 5, wherein the individual behavior satisfies one or more of a traffic rule requirement and a safety requirement in the region.

14. A system comprising:
an processor including a non-transitory memory storing computer code which, when executed by the processor, causes the processor to:
receive, by an ego vehicle, Vehicle-to-Everything (V2X) data from a set of remote vehicles in a region, wherein the V2X data includes customized data describing (1) driving preferences of one or more different remote vehicles in the set which are uniquely identified in the V2X data and preference weights for each driving preference, the preference weights each describing how strong the corresponding driving preference is, and (2) driving intentions of the different remote vehicles in the set and intention weights for each driving intention, the intention weights each describing how strong the corresponding driving intention is;
determine, by the ego vehicle, customized needs of individual remote vehicles within the set of remote vehicles based on the V2X data;
determine, by the ego vehicle, a presence and identity of one or more uncontrollable vehicles within the set of remote vehicles;
reserve, by the ego vehicle, a safe area within the region for the uncontrollable vehicles;
determine, by the ego vehicle, an overall optimum behavior of the region based on one or more of the customized data, the customized needs of the individual remote vehicles, and the safe area;
determine, by the ego vehicle, a set of relative weights by comparing the preference weights and the intention weights across the different remote vehicles;
negotiate, by the ego vehicle and the set of remote vehicles using one or more wireless messages exchanged with a set of vehicle control systems included in the different remote vehicles, a set of individual behaviors of the different remote vehicles based on the customized needs of the different remote vehicles and the set of relative weights so that the overall optimum behavior of the region is achieved by the set of vehicle control systems executing of the set of individual behaviors; and
execute operations to modify an operation of the set of vehicle control systems included in the different remote vehicles so that the set of individual behaviors is executed and the overall optimum behavior.

15. The system of claim 14, wherein executing the operations results in one or more of the following: no collision occurs between the remote vehicles and one or more other vehicles in the region; and the customized need of the remote vehicles is satisfied without interference on one or more customized needs of the one or more other vehicles.

16. The system of claim 14 further comprising negotiating the individual behaviors assigned to the different remote vehicles with the vehicle control systems of these different remote vehicles.

17. The system of claim 14, wherein the customized need of the remote vehicles is described by one or more customized parameters, including the driving preferences and the driving intentions, and one or more weights for the one or more customized parameters.

18. The system of claim 14 further comprising determining the set of relative weights based on machine learning analysis.

19. The system of claim 17, wherein the computer code, when executed by the processor, causes the processor further to:
   analyze the V2X data that includes one or more of parameter data describing the one or more customized parameters, weight data describing the one or more weights, sensor data of remote vehicles and Advanced Driver Assistance System (ADAS) data of the remote vehicles.

20. The system of claim 14, wherein the computer code, when executed by the processor, causes the processor further to:
   predict a future behavior of the remote vehicles, wherein the V2X data further includes prediction data describing the future behavior of the remote vehicles.

\* \* \* \* \*